US007533381B2

(12) United States Patent
Ando

(10) Patent No.: US 7,533,381 B2
(45) Date of Patent: May 12, 2009

(54) IMAGE FORMING APPARATUS AND METHOD FOR OPERATING IMAGE FORMING APPARATUS BY USING REMOTE APPLICATION

(75) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 934 days.

(21) Appl. No.: 10/807,323

(22) Filed: Mar. 24, 2004

(65) Prior Publication Data

US 2004/0255263 A1 Dec. 16, 2004

(30) Foreign Application Priority Data

Mar. 25, 2003 (JP) ............................ 2003-082908
Mar. 18, 2004 (JP) ............................ 2004-078979

(51) Int. Cl.
*G06F 9/455* (2006.01)

(52) U.S. Cl. .......................... 718/1; 707/201; 709/213; 709/221; 709/245; 710/8

(58) Field of Classification Search ................. 709/221, 709/213, 245; 710/8; 707/201; 718/1
See application file for complete search history.

(56) References Cited

U.S. PATENT DOCUMENTS 5,109,515 A * 4/1992 Laggis et al. ................. 707/10
5,603,060 A * 2/1997 Weinberger et al. ............ 399/8
5,699,494 A * 12/1997 Colbert et al. ............. 358/1.15
6,023,586 A * 2/2000 Gaisford et al. ............. 717/178
6,286,059 B1 * 9/2001 Sugiura ....................... 710/14
6,430,570 B1 8/2002 Judge et al.
6,453,127 B2 * 9/2002 Wood et al. .................... 399/8
6,498,611 B1 * 12/2002 Beard et al. ................. 715/752
7,051,281 B1 * 5/2006 Yokota ....................... 715/740
7,260,624 B2 * 8/2007 Sivertsen .................... 709/223
2001/0002472 A1 * 5/2001 Kanai et al. ................. 709/217
2001/0037399 A1 * 11/2001 Eylon et al. ................. 709/231
2001/0051955 A1 * 12/2001 Wong ......................... 707/201
2002/0019891 A1 * 2/2002 Morrow et al. ................. 710/8
2002/0073410 A1 * 6/2002 Lundback et al. ........... 717/171
2002/0161867 A1 * 10/2002 Cochran et al. ............. 709/221
2003/0023700 A1 * 1/2003 Swinton et al. ............. 709/208

(Continued)

FOREIGN PATENT DOCUMENTS

EP 1 246 058 A2 10/2002

(Continued)

OTHER PUBLICATIONS

U.S. Appl. No. 10/627,731, filed Jul. 28, 2003, Akiyoshi et al.

(Continued)

*Primary Examiner*—Thomas Lee
*Assistant Examiner*—Jaweed A Abbaszadeh
(74) *Attorney, Agent, or Firm*—Oblon, Spivak, McClelland, Maier & Neustadt, P.C.

(57) ABSTRACT

An image forming apparatus that includes a control part that provides common services on control of hardware resources to a plurality of applications so as to be able to include a plurality of applications is provided. The image forming apparatus includes a virtual machine; an application that is executed by the virtual machine; and an application management part managing the application that is executed by the virtual machine.

29 Claims, 20 Drawing Sheets

U.S. PATENT DOCUMENTS

| | | | | |
|---|---|---|---|---|
| 2003/0028690 | A1* | 2/2003 | Appleby-Alis et al. | 710/8 |
| 2003/0030664 | A1* | 2/2003 | Parry | 345/744 |
| 2003/0033450 | A1* | 2/2003 | Appleby-Alis | 710/8 |
| 2003/0041127 | A1* | 2/2003 | Turnbull | 709/220 |
| 2003/0041132 | A1* | 2/2003 | Lim et al. | 709/221 |
| 2003/0051011 | A1* | 3/2003 | Schacht et al. | 709/221 |
| 2003/0051012 | A1* | 3/2003 | Chen | 709/221 |
| 2003/0051077 | A1* | 3/2003 | Fengler | 710/8 |
| 2003/0107588 | A1* | 6/2003 | Elsbree et al. | 345/700 |
| 2004/0006632 | A1* | 1/2004 | Cheng | 709/231 |

FOREIGN PATENT DOCUMENTS

| | | |
|---|---|---|
| JP | 2000-122853 | 4/2000 |
| JP | 2002-244754 | 8/2002 |
| JP | 2002-287990 | 10/2002 |
| JP | 2002-314749 | 10/2002 |
| KR | 2003019824 A * | 3/2003 |

OTHER PUBLICATIONS

U.S. Appl. No. 10/665,536, filed Sep. 22, 2003, Motoyama.
U.S. Appl. No. 11/216,013, filed Sep. 1, 2005, Ando et al.
U.S. Appl. No. 11/057,256, filed Feb. 15, 2005, Ando et al.
U.S. Appl. No. 10/915,333, filed Aug. 11, 2004, Shimizu et al.
U.S. Appl. No. 11/509,601, filed Aug. 25, 2006, Ando et al.
U.S. Appl. No. 11/521,495, filed Sep. 15, 2006, Ando.
U.S. Appl. No. 11/521,567, filed Sep. 15, 2006, Ando.
U.S. Appl. No. 11/250,405, filed Oct. 17, 2005, Shimizu.
Monthly Magazine "Java World" vol. 6, No. 6, Kabushikikaisha IDG Japan, Published Jun. 1, 2002, pp. 36-50.
"Java Press" vol. 23, Kabushikikisha Gijyutsuhyoronsha, Published Apr. 15, 2002, pp. 192-205.

* cited by examiner

FIG.6

```
import java.lang.*;
import com.ricoh.gw.*;                                   //←(1)
public class UserApp extends GWApp                       //←(2)
{
    public static void main()
    {
        Panel panel = new Panel();
        Printer printer=new Printer();                   //←(3)
        PanelWindow mainwindow = new PanelWindow(panel.root());
        ItemString simple = new ItemString("Simple Printer"); //←(4)
        MessageItem salutation = new MessageItem(simple);
        salutation.setRect(100,10,100,10);
        mainwindow.addItem(salutation);
        ItemString inputstr = new ItemString("Get input filename...");
        ButtonItem inputButton = new ButtonItem();       //←(5)
        inputButton.setButtonShape(ButtonItem.BTN_ZAB);
        inputButton.setRect(100,100,100,100);
        inputButton.setWink(true);
        mainwindow.addItem(inputButton);
        inputButton.addChangeListener(                   //←(6)
            new GWChangeListener()
            {
                public void stateChanged(GWEvent e)
                {
                    String answer =
                        SoftKeyboardWindow.request(
                            "Input filename",
                            "", 256,
                            ItemString.LANG_ENGLISH_US   //←(7)
                        );
                    printer.printerDocument( new ItemString(answer) );//←(8)
                }
            }
        }
}
```

FIG.10

```
<?xml version="1.0" encoding="utf-8"?>
<! - - JNLP File for JSDK Demo Application - ->
<jnlp
  spec="1.0+"
  codebase="sdcard://jsdk/0123"
  href="jsdk_demo.jnlp">
  <information>                                                        (1)
     <title> Jsdk Demo Application</title>                             1A
     <vendor>JSDK Providers Inc.</vendor>                              1B
   <telephone>092-441-####</telephone>                                 1C
   <fax>092-411-####</fax>                                             1D
   <product-id>0123456</product-id>                                    1E
     <homepage href="docs/help.html"/>
     <description>JSDK Demo Application</description>
     <icon href="images/JSDK_demo.jpg"/>
     <offline-allowed/>
  </information>
  <security>                                                           (2)
       <all-permissions/>
  </security>
  <resources>                                                          (3)
     <jsdk version="1.0"/>                                             3A
     <jar hrel="JSDKdemo.jar" version="1.0.1"/>                        3B
     <sub-jnlp="http://www.ricoh.co.jp/jsdk/ocr.jnlp"/>                3C
  </resources>
  <update mode="mail">                                                 (4)
     <mail address="xxx@yyy.zzz.co.jp"/>
  </update>
  <install mode="auto">                                                (5)
     <destination path="sdcard:/jsdk/0123"/>
  </install>
  <xlet-desc class="JSDKdemo" type="noGUI"/>                           (6)
</jnlp>
```

IMAGE FORMING APPARATUS AND METHOD FOR OPERATING IMAGE FORMING APPARATUS BY USING REMOTE APPLICATION

BACKGROUND OF THE INVENTION

1. Field of the Invention

The present invention relates to techniques for operating an image forming apparatus by using a JAVA application.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, pieces of software corresponding to the printer, copier and facsimile respectively are provided, so that the compound machine functions as the printer, the copier, the scanner and the facsimile respectively by switching the pieces of software.

Since the conventional compound machine is provided with respective pieces of application software for the printer, the copier, the scanner and the facsimile, much time is required for developing each application. To solve this problem, the applicant has developed a compound machine including hardware resources, a plurality of applications, and a platform including various control services provided between the applications and the hardware resources. The hardware resources are used for image forming processes for a display part, a printing part and an image pickup part. The applications perform processes intrinsic for user services of printer, copier and facsimile and the like. The platform includes various control services for performing management of hardware resources necessary for at least two applications commonly, and for performing execution control of the applications and image forming processes, when a user service is executed.

According to such a new compound machine, the applications and the control services are provided separately. Thus, after the compound machine is shipped, users or third party venders can develop new applications to install on the compound machine without changing the system side software.

Various applications are developed. For developing the applications, from a viewpoint of supporting various platforms and network communications, it is considered to use JAVA applications as applications for the compound machine. As a conventional technology relating to the JAVA application, a technology described in Japanese laid open patent application No. 2002-287990 is known, for example.

For executing the JAVA applications on the compound machine, a module is necessary for managing the JAVA applications. In addition, for developing the JAVA application for the compound machine, it is necessary to evaluate the developed application whether the application actually operates on the compound machine after the JAVA application is developed on a PC and the like. However, it is troublesome to install and execute the JAVA application on the compound machine every time when the evaluation is performed. Thus, an environment is required in which the developed application can be directly executed on the compound machine from the PC on which the application is developed. In addition, if remotely executed JAVA application can operate the compound machine, user convenience increases for using the JAVA application.

SUMMARY OF THE INVENTION

An object of the present invention is to provide an environment in which the JAVA application can be easily executed in the compound machine and to provide an environment in which the compound machine can be operated by a JAVA application that is executed on a terminal apparatus such as the PC.

The above object is achieved by an image forming apparatus that includes a control part that provides common services on control of hardware resources to a plurality of applications so as to be able to include a plurality of applications, the image forming apparatus including:

a virtual machine;

an application that is executed by the virtual machine; and an application management part managing the application that is executed by the virtual machine.

According to the present invention, since the virtual machine is provided on the application layer of the image forming apparatus, the JAVA application that can be executed by the virtual machine can be executed. In addition, since the application management part is provided, it is easy to add, delete, and manage JAVA applications. Thus, the JAVA application can be easily executed on the image forming apparatus.

In the image forming apparatus, the application that is executed by the virtual machine can operate the image forming apparatus by using classes for controlling the image forming apparatus. The classes include an operation panel class for outputting information to an operation panel of the image forming apparatus and for inputting information from the operation panel. By using the classes, the JAVA application can be easily developed.

In the image forming apparatus, the application management part includes execution management functions that include a function for launching the application executed by the virtual machine. In addition, the application management part downloads the application when the application is not installed in the image forming apparatus.

The application management part refers to an application information file associated with the application, and updates the application on the basis of information in the application information file. Since the application can be updated on the basis of the setting of the application information file, the application can be automatically updated.

The application management part can compare a first version described in the application information file associated with the application with a second version described in another application information file associated with an update application, and the application management part replaces the application with the update application if the second version is newer than the first version. Thus, an old application can be automatically updated.

The application management part may download the application from a memory card or from a Web site. In addition, the application management part may download the application from a location described in the application information file associated with the application. The application management part can check whether the application is executable in the image forming apparatus before downloading the application, and the application management part can check whether the application is executable on the basis of information described in the application information file associated with the application. In addition, the application management part can check items including a resource item in the image forming apparatus necessary for executing the application. Therefore, the application can be safely installed and updated.

The image forming apparatus may include a server application that receives an operation request from a terminal apparatus connected to the image forming apparatus and that operates the image forming apparatus according to the operation request. According to the present invention, the image forming apparatus can be operated by the application executed in the terminal apparatus. The application management part communicates with the terminal apparatus.

In addition, the above-mentioned object is achieved by a terminal apparatus that operates an image forming apparatus configured to be able to include a plurality of applications, the terminal apparatus including:

a virtual machine;

an application that is executed by the virtual machine and that operates the image forming apparatus; and an application management part managing the application that is executed by the virtual machine.

According to the present invention, the image forming apparatus can be operated by the application executed in the terminal apparatus.

The terminal apparatus is connected to the image forming apparatus via a network, and the application that is executed by the virtual machine operates the image forming apparatus by using classes for controlling the image forming apparatus. In addition, the terminal apparatus can operate the image forming apparatus by using a JAVA based distributed object processing technique. By using the JAVA based distributed object processing technique that supports processing via a network, the image forming apparatus can be operated by an application executed in an apparatus on a network.

In the terminal apparatus, the classes may include a function for displaying, on the terminal apparatus, an emulated screen of a screen displayed on an operation panel of the image forming apparatus. Thus, the user can operate the image forming apparatus from the terminal apparatus as if to operate the image forming apparatus directly.

The terminal apparatus may have a function for allowing a user to select whether to access a hard disk of the image forming apparatus or to access a hard disk of the terminal apparatus. For example, the user can select a file stored in the hard disk of the image forming apparatus from the terminal apparatus.

In the terminal apparatus, the application management part may include execution management functions that include a function for launching the application, and may download the application when the application is not installed in the terminal apparatus by communicating with the image forming apparatus. In addition, the application management part can refer to an application information file associated with the application, and update the application on the basis of information in the application information file.

The application management part can download the application from a memory card that is inserted in the image forming apparatus or from a Web site. In addition, the application management part can receive file information stored in the memory card and displays the file information on the terminal apparatus.

The application management part can send URL information input into the terminal apparatus to the image forming apparatus, so that the image forming apparatus downloads the application from the Web site by using the URL information. Since the application management part communicates with the image forming apparatus for performing processes, the management function for applications in the image forming apparatus can be extended to the terminal apparatus.

BRIEF DESCRIPTION OF THE DRAWINGS

Other objects, features and advantages of the present invention will become more apparent from the following detailed description when read in conjunction with the accompanying drawings, in which:

FIG. 6 shows a program list of the JAVA application;

FIG. 10 shows an example of a syntax of a JNLP file;

DETAILED DESCRIPTION OF THE PREFERRED EMBODIMENTS

In the following, embodiments of the present invention are described with reference to figures. In the following, a JAVA execution environment in the compound machine is described as first and second embodiments. Next, an environment in which the compound machine is operated by executing an application, developed in a PC and the like, in the PC is described as third and fourth embodiments. First, the compound machine used in the first to third embodiments is described.

Figure 1:
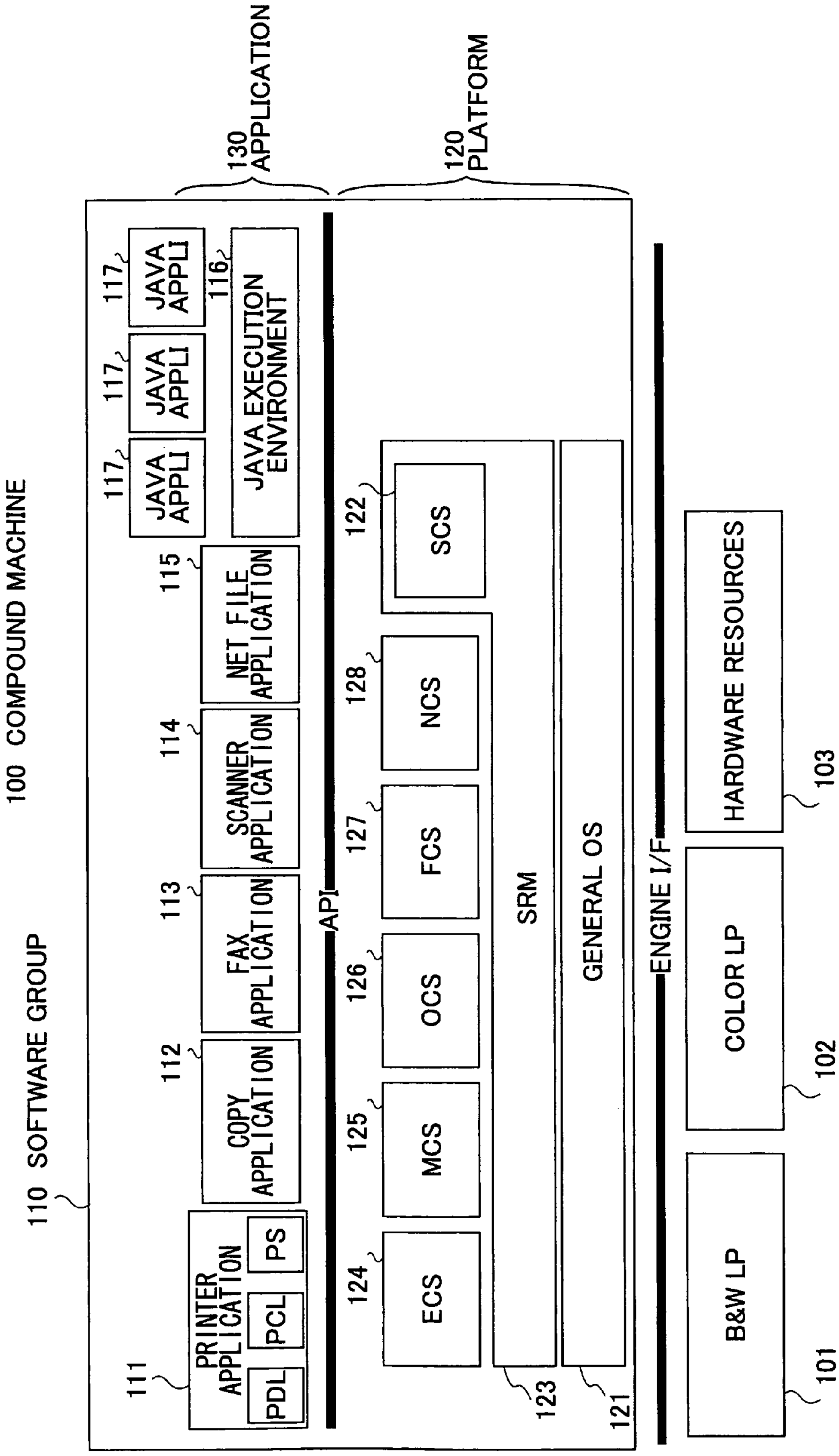
FIG. 1 is a block diagram of a compound machine 100 according to an embodiment of the present invention.

FIG. 1 is a block diagram of a compound machine 100 according to an embodiment of the present invention.

As shown in FIG. 1, the compound machine 100 includes hardware resources 103 and a software group 110. The hardware resources 103 include a black and white laser printer (B&W LP) 101, a color laser printer 102, and hardware resources such as a scanner, a facsimile, a hard disk, memory (RAM, NV-RAM, ROM and the like) and a network interface. The software group 110 includes a platform 120, and applications 130.

The platform 120 includes control services for interpreting a process request from an application to issue an acquiring request for the hardware resources, a system resource manager (SRM) 123 for managing one or more hardware resources and arbitrating the acquiring requests from the control services, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, and a network control service (NCS) 128. The platform 120 has application program interfaces (API) that can receive process requests from the applications 130 by using predetermined functions.

The general purpose OS 121 is a general purpose operating system such as UNIX, and can execute each piece of software of the platform 120 and the applications 130 concurrently as respective processes.

The process of the SRM 123 is for performing control of the system and performing management of resources with the SCS 122. The process of the SRM 123 performs arbitration and execution control for requests from the upper layer that uses hardware resources including engines such as the scanner part and the printer part, a memory, a HDD file, and a host I/Os (Centronics I/F, network I/F IEEE1394 I/F, RS232C I/F and the like).

The process of the SCS 122 performs application management, control of the operation panel, display of system screen, LED display, resource management, and interrupt application control. The process of the ECS 124 controls engines of hardware resources including the white and black laser printer (B&W LP) 101, the color laser printer (Color LP) 102, the scanner, and the facsimile and the like.

The process of the MCS 125 obtains and releases an area of the image memory, uses the hard disk apparatus (HDD), and compresses and expands image data. The process of the FCS 127 provides APIs for sending and receiving facsimile by using PSTN/ISDN network from each application layer, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network to a corresponding application, and acts as mediation between the application and the network when sending data to the network. More specifically, the process of the NCS 128 includes server daemon such as ftpd, httpd, lpd, snmpd, telnetd, smtpd, and client function of the protocols.

The process of the OCS 126 controls an operation panel that is a means for transferring information between the operator (user) and control parts of the machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application that has control right or from a control service. When the application is developed, functions in the OCS function library is linked to an object program that is generated by compiling a source code file of the application, so that an executable file of the application is generated.

The applications 130 include a printer application 111 that is an application for a printer having page description language (PDL) and PCL and post script (PS), a copy application 112, a fax application 113 that is an application for facsimile, a scanner application 114 that is an application for a scanner, and a network file application 115. In addition, a JAVA execution environment 116 and a JAVA application 117 are included. The compound machine 100 shown in FIG. 1 includes a plurality of JAVA applications.

Interprocess communication is performed between a process of the application and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of this embodiment includes a plurality of applications 130 and a plurality of control services, and each of those operates as processes. In each process, one or more threads are generated and the threads are executed in parallel. The control services provide common services to the applications 130. User services on image formation such as copying, printing, scanning and sending facsimile are provided while the processes are executed in parallel, the threads are executed in parallel, and interprocess communication is performed. A third party vendor can develop new applications for the compound machine 100, and can execute the applications in the application layer on the control service layer in the compound machine 100.

Figure 2:
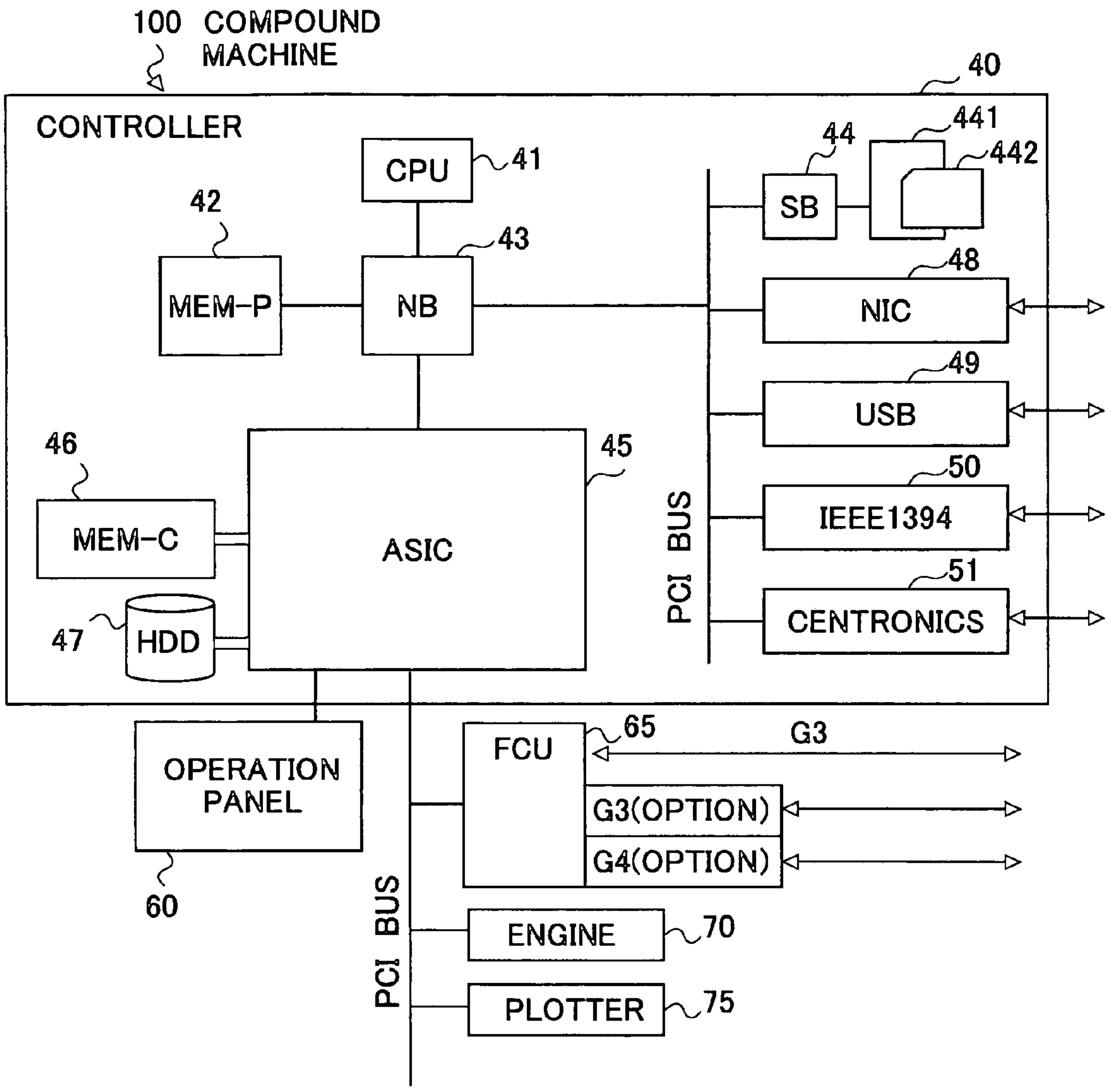
FIG. 2 shows an example of a hardware configuration of the compound machine 100.

FIG. 2 shows an example of a hardware configuration of the compound machine 100.

As shown in FIG. 2, the compound machine 100 includes a controller 40, an operation panel 60, a fax control unit (FCU) 65, and an engine 70 and a plotter 75.

The controller 40 includes a CPU 41, a MEM-P (system memory) 42, a north bridge (NB) 43, a south bridge (SB) 44, an ASIC 45, a MEM-C (local memory) 46, an HDD 47, a network interface card (NIC) 48, a USB device 49, an IEEE1394 device 50, and a Centronics 51.

The operation panel 60 is connected to the ASIC 45 of the controller 40 directly. The FCU 65, interfaces, the engine 70 and the plotter 75 are connected to the ASIC 45 in the controller 40 via a PCI bus.

The CPU 41 controls the compound machine 100. The NB 43 is a bridge for connecting the CPU 41, the MEM-P 42 and the ASIC 45. The MEM-P 42 is a system memory used as a drawing memory for example. The SB 44 is a bridge for connecting the NB 43 and peripheral devices. In this embodiment, a memory card slot 441 is provided in which a memory card 442 can be inserted. The MEM-C 46 is a local memory used as a copy image buffer, a code buffer and the like. The ASIC 45 is an IC for image processing including hardware for image processing. The HDD 47 is a storage for storing image data, programs, font data and the like.

First Embodiment

Next, the execution environment 116 of the JAVA application 117 in the compound machine 100 is described as the first embodiment.

Figure 3:
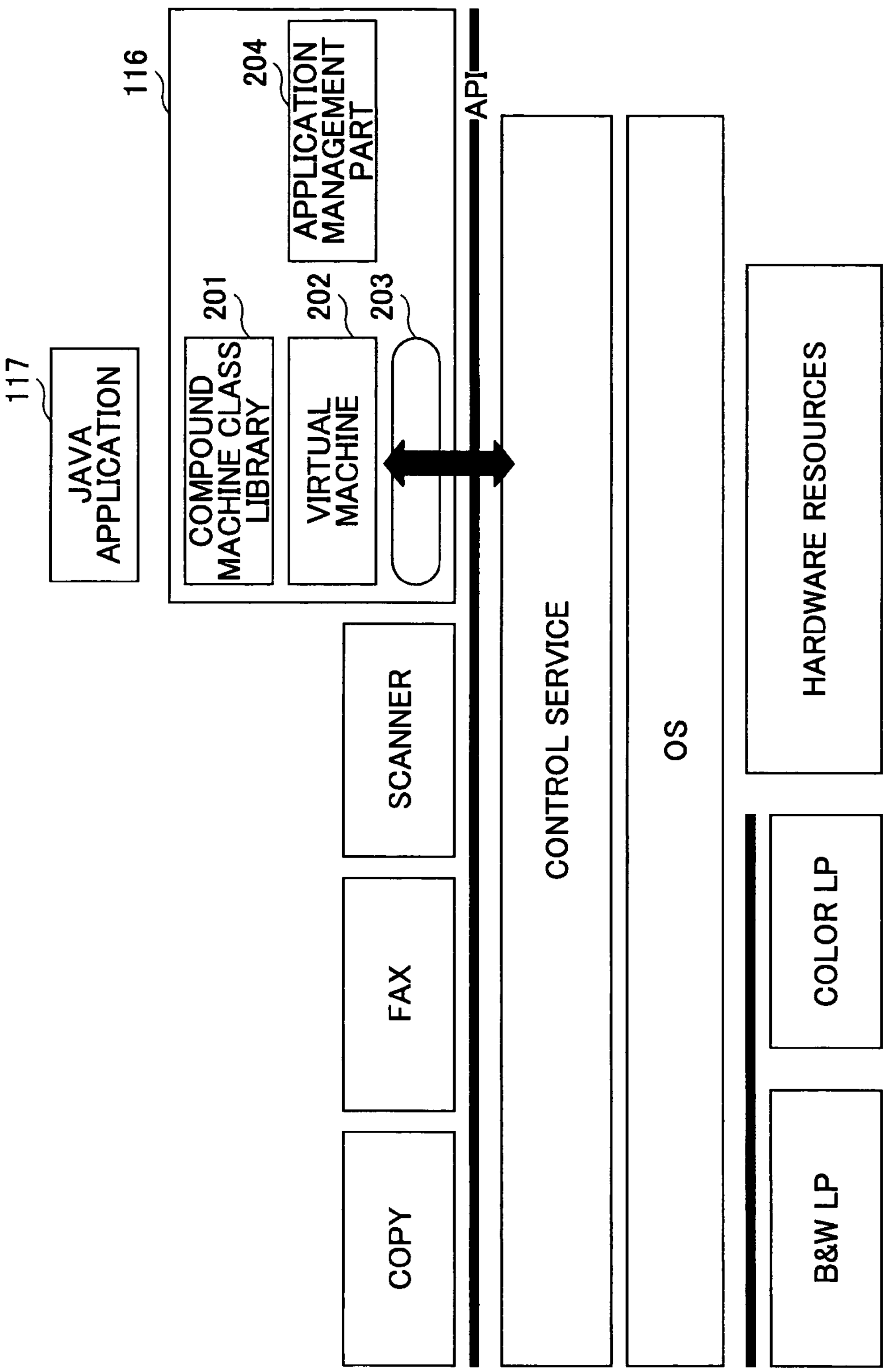
FIG. 3 shows a configuration example of a JAVA execution environment 116 according to a first embodiment.

FIG. 3 shows a configuration example of the JAVA execution environment 116 according to the first embodiment. As shown in FIG. 3, the JAVA execution environment 116 includes a compound machine class library 201, a virtual machine 202, a native program interface 203 and an application management part 204.

The compound machine class library 201 is a class library used for the JAVA application 117 to easily operate the compound machine 100, so that the JAVA application 117 can access APIs of the compound machine 100 by using the mechanism of the native program interface 203. By the compound machine class library 201, machine-dependent functions can be identified, simple operation functions are provided, and various object oriented classes can be provided.

The compound machine class library 201 according to this embodiment includes a basic JAVA class library, event classes for processing events, network transaction classes for performing processes for network communications, operation panel classes for drawing images on the operation panel of the compound machine 100, compound machine control classes for controlling the compound machine 100 and the like. The operation panel class and the compound machine control class are classes specific for the compound machine 100 of this embodiment. The operation panel class and the compound machine control class may be referred to as "compound machine class" hereinafter, and other classes (the basic JAVA class library, event classes, network transaction classes) may be referred to as "JAVA core class".

A JAVA source code program is compiled into intermediate code (byte code). The virtual machine 202 has functions for interpreting and executing the byte code. The native program interface 203 has functions for the JAVA code executed by the virtual machine 202 to be interoperable with applications and libraries written by a different programming language such as the C language.

The application management part 204 has functions for managing the JAVA applications. For example, the application management part 204 has functions for displaying a list of JAVA applications, installing and updating the JAVA applications, deleting installed JAVA applications, setting a password for registering applications, storing JAVA applications and the like. In addition, the application management part 204 performs JAVA application execution management such as launch, forced termination, suspend, and resume for the JAVA application.

Figure 4A:
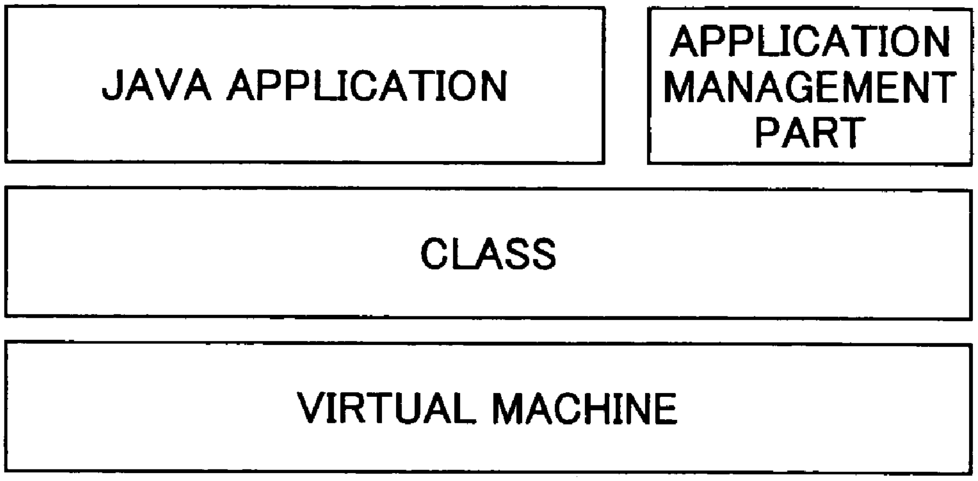
FIGS. 4A and 4B show implementation examples of an application management part 204.
Figure 4B:
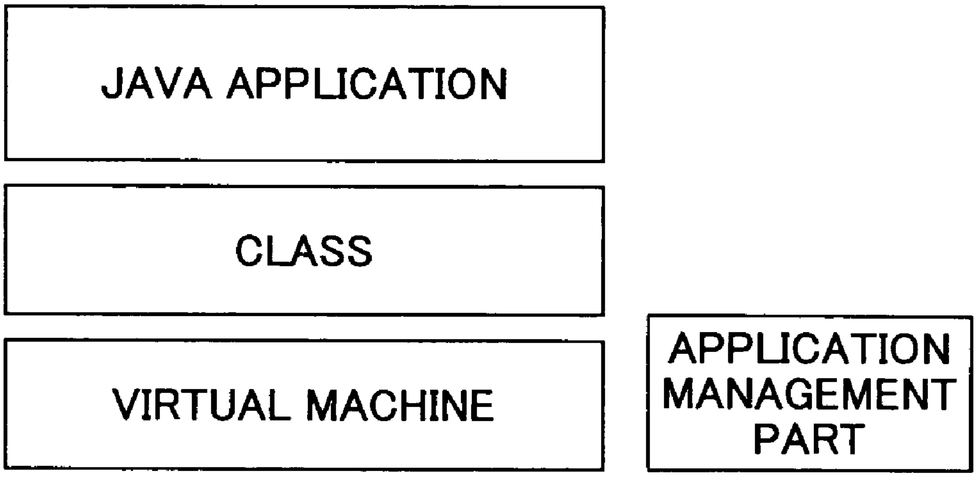

The application management part 204 is implemented in the compound machine 100 as a component independent from the virtual machine 202, so that the application management part 204 cannot be controlled from the JAVA application 117. As shown in FIGS. 4A and 4B, the application management part 204 can be implemented as a JAVA application (FIG. 4A), or can be implemented as a C language program (FIG. 4B) or the like.

Since the JAVA execution environment 116 is an application mounted on the compound machine 100, the JAVA execution environment 116 can be installed into the compound machine 100 in the same way as other applications. For example, the JAVA execution environment 116 can be installed into the compound machine 100 from a memory card.

(Example of Java Application)

Figure 5:
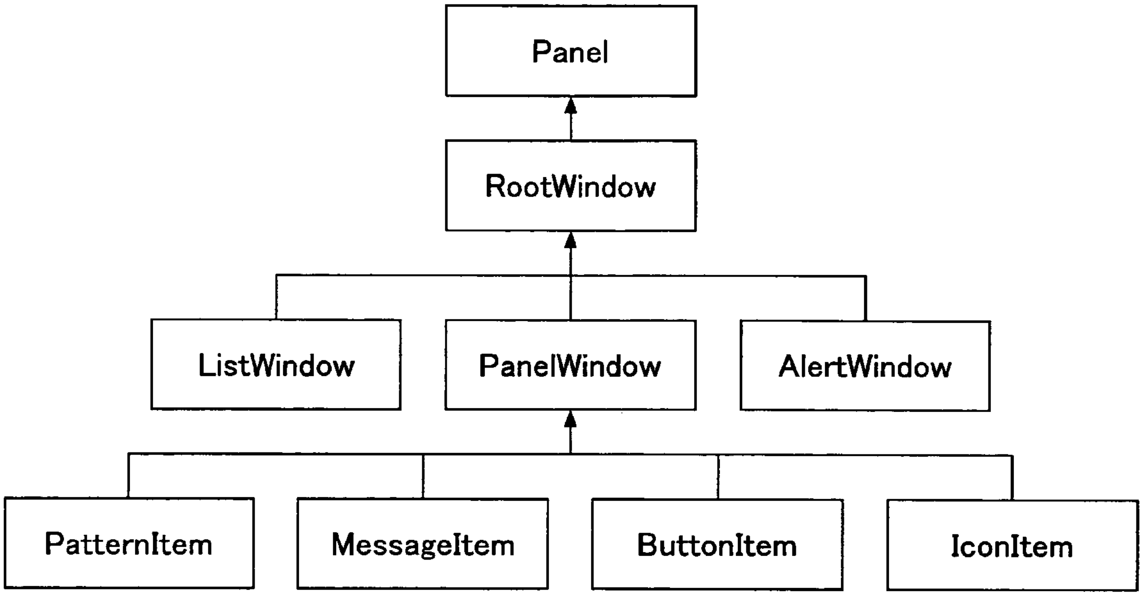
FIG. 5 shows an example of a hierarchy structure of the operation panel used by the JAVA application.

Next, an example of the JAVA application is described. In the following example, a JAVA application that uses the operation panel class is described. FIG. 5 shows an example of a hierarchy structure of the operation panel class used by the JAVA application. FIG. 6 shows a program list of the JAVA application. In the following, the application program may be referred to as "simple printer".

Next, the program shown in FIG. 6 is described. This program causes the compound machine 100 to display a user interface screen on the operation panel of the compound machine 100, receive a specified print file name from the operation panel, and print the specified file. The outline of the operation of the program is as follows.

Figure 7:
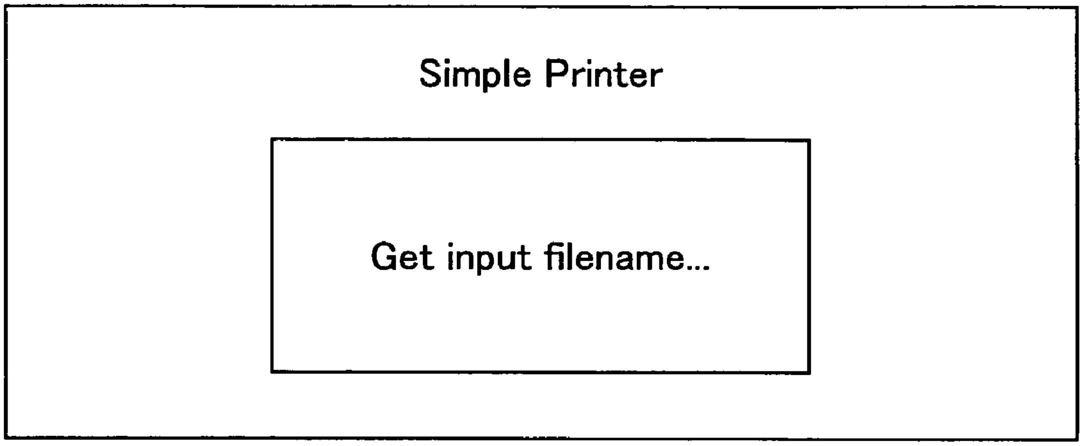
FIG. 7 is a screen displayed by the simple printer.
Figure 8:
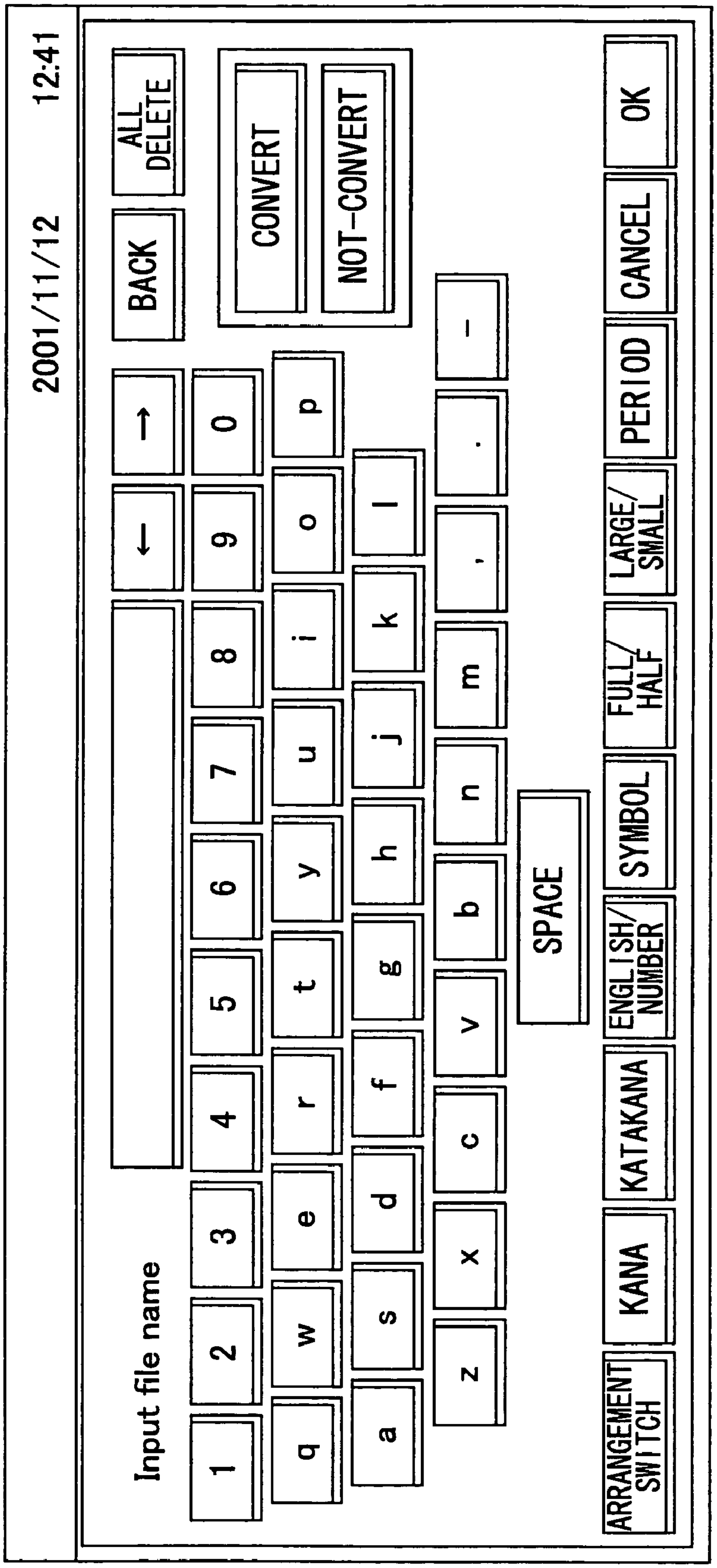
FIG. 8 is an example of a soft keyboard displayed by executing the simple printer.

Right after the compound machine 100 is launched, a screen shown in FIG. 7 is displayed on the operation panel. As shown in FIG. 7, a character string "Simple Printer" is displayed on the upper part of the screen, and a button of "Get input filename . . . " is displayed on the center part of the screen. When the user touches the button of "Get input filename . . . ", a software keyboard shown in FIG. 8 as an example is shown on the operation panel. On the software keyboard, a title: "Input file name" is displayed, so that the user inputs a name of a file that the user wants to print. For example, when the user inputs "/usr/hdd/photo.tiff", the program causes the compound machine 100 to print the "photo.tiff" file that is stored in a directory: "/usr/hdd".

In the following, the program is described according to the numbers of annotations of the program.

"(1)" is a command for using the compound machine class library. "(2)" indicates that GWApp is inherited, in which GWApp is a prototype (abstraction) of the application of the compound machine on initial setting and end processing. Accordingly, the user does not need to write complicated initial setting code and end processing code, and processes for receiving a message and the like can be hidden from the user.

By "(3)", an object for operating a printer is created, and an object for displaying a message: "Simple Printer" is created by "(4)", and a button object for "Get input filename . . . " is created by "(5)". "(6)" indicates to add an object such that a software keyboard is displayed at the time when the user touches the button. "(7)" indicate to display the software keyboard and prompt the fine name. The file specified by the software keyboard is printed by "(8)".

In the button operation ((5) "Get input filename . . . "), the result of the button operation is received by the program as a message, and the program performs a process corresponding to the button operation in response to receiving the message. The process is set in addChangeListener( ) of (6).

(Example of Procedure from Download to Launch)

Figure 9:
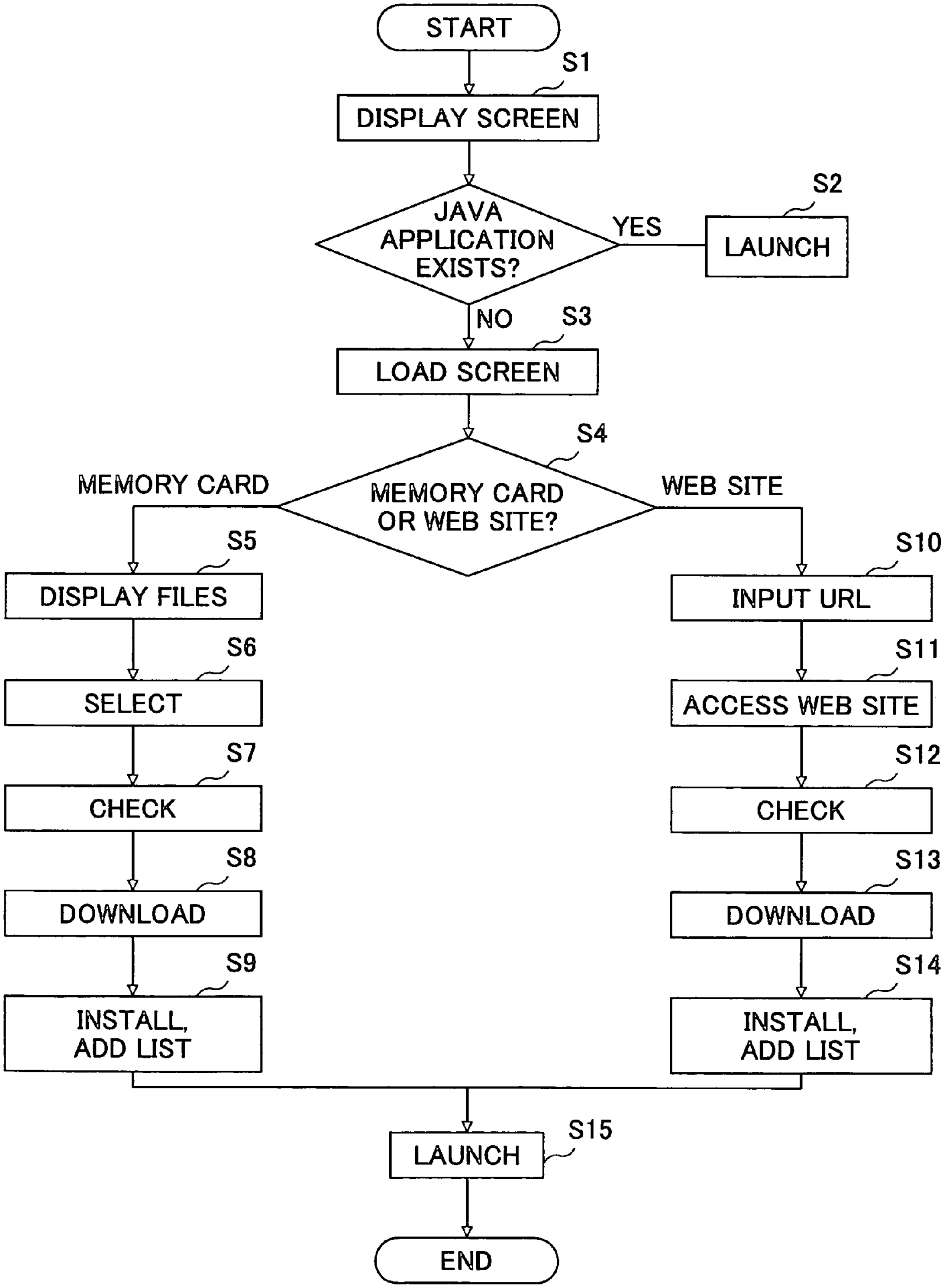
FIG. 9 is a flowchart showing a procedure for launching the simple printer according to the first embodiment.

Installing and launching of the JAVA application is managed by the application management part 204. Thus, by using the functions of the application management part 204, processes from download to launch can be performed in the following way. The procedure is described taking a case for launching the simple printer as an example with reference to a flowchart shown in FIG. 9.

The application management part 204 is launched when the compound machine 100 is launched like other applications. By pushing an application selection key corresponding to the application management part 204, a user interface screen for operating the application management part 204 is displayed on the operation panel of the compound machine 100 in step S1. When the user identifies, on the user interface screen, that the simple printer is installed as a JAVA application, the user selects the simple printer to execute it in step S2.

If the simple printer is not installed, an application load screen is displayed by specifying load of application from the user interface screen in step S3.

On the application load screen, the user selects whether to download the simple printer from a Web site or to download it from a memory card inserted into the compound machine in step S4.

In the case when the simple printer is downloaded from the memory card, the application management part 204 checks files in the memory card, and displays file names stored in the memory card on the operation panel in step S5. When the user selects the simple printer in step S6, the application management part 204 checks if the application can be executed on the compound machine 100 in step S7. According to the result of the check, if the application can be executed, the application is downloaded and installed into the hard disk. In addition, the application management part 204 obtains the application name (simple printer) and add it to an application list in step S9, in which the application list is a file managed by the application management part 204 for the user to recognize installed JAVA applications.

In the case when the simple printer is downloaded from the Web server, Web is selected in the step S4, so that a screen for specifying a URL is displayed from which screen the user inputs a URL of a Web site having the simple printer program in step S10. Then, the application management part 204 accesses the Web site in step S11, and checks if the simple printer can be executed on the compound machine in step S12, and downloads the simple printer in step S13. Then, the application management part 204 installs the simple printer into the hard disk, obtains the application name (simple printer) and adds the name to the application list in step S14.

Alternatively, the application management part 204 may automatically searches for the memory card or the Web server to install the application into the hard disk. In the above-mentioned example, although an example in which the JAVA application is installed into the hard disk is described, the JAVA application is not necessarily installed into the hard disk to execute the JAVA application.

For checking if the JAVA application can be executed in the compound machine 100, the application management part 204 checks program size, version of the program, program latest update information, use memory work size, use storage size, use network address, the term of validity (usable number), application program name and the like. These items of information are associated with the JAVA application. As described later, the items of information may be obtained from a JNLP file corresponding to the JAVA application.

After the above-mentioned processes ends, the downloaded simple printer can be used, so that the user launches the simple printer from the user interface screen in step S15. Accordingly, the virtual machine 202 is launched and the simple printer is executed.

The launched simple printer operates the compound machine 100 by using the JAVA core class and the compound machine class so as to display the before-mentioned user interface screen for the simple printer. The user inputs a name of a file that the user wants to print, so that the file is printed. In this example, "/usr/hdd/photo.tiff" is input, and a "photo.tiff" file that is stored in a "/usr/hdd" directory in the hard disk in the compound machine 100 is printed.

After the printing ends, the application management part 204 terminates execution of the simple printer.

Second Embodiment

The compound machine 100 can automatically update a JAVA application that is installed in the compound machine 100 by using JNLP (JAVA Networking Language Protocol). In the following, automatic update of the JAVA application by using JNLP is described. Following processes are controlled by the application management part 204.

Since "JNLP file" (to be also referred to as "application information file") is used in the following processes, a description is given first for the JNLP file. The JNLP file is in a one-to-one correspondence with a JAVA application, and includes information on definitions of the JAVA application. That is, a JNLP file is attached to each JAVA application.

FIG. 10 shows an example of a syntax of the JNLP file. The JNLP file is a XML(eXtensible Markup Language) file. The format of the JNLP file is in conformity with JNLP standard. However, the JNLP used in this embodiment is extended. Following is the extension.

In FIG. 10, the description 1 is an information element which includes a title element (description 1A) indicating an application name, a vender element (description 1B) indicating a vender name, a telephone element (description 1C) indicating a telephone number of the vender, a fax element (description 1D) indicating a fax number of the vender, and a product ID element (description 1E) indicating a product ID of the application.

The description 2 indicates a security element. The description 3 indicates a resource element which includes a jsdk element (description 3A) indicating a version of a JAVA application, a jar element (description 3B) indicating a Jar file (execution file of the JAVA application) and the version, and a sub-jnlp element (description 3C) indicating a SUB-JNLP file.

The description 4 is an update element which is an element for setting an execution method of update. If the element is "auto", update of the application is automatically performed. If the element is "manual", update of the application is performed manually. If the element is "mail", an update notification mail is delivered when update of the application can be performed.

The description 5 indicates an install element which indicates an execution method for install. If the element is "auto", an install destination of the application is automatically selected. If the element is "manual", the install destination of the application is manually selected. The description 6 indicates whether the type of the application is "GUI present" or "GUI absent".

Figure 11:
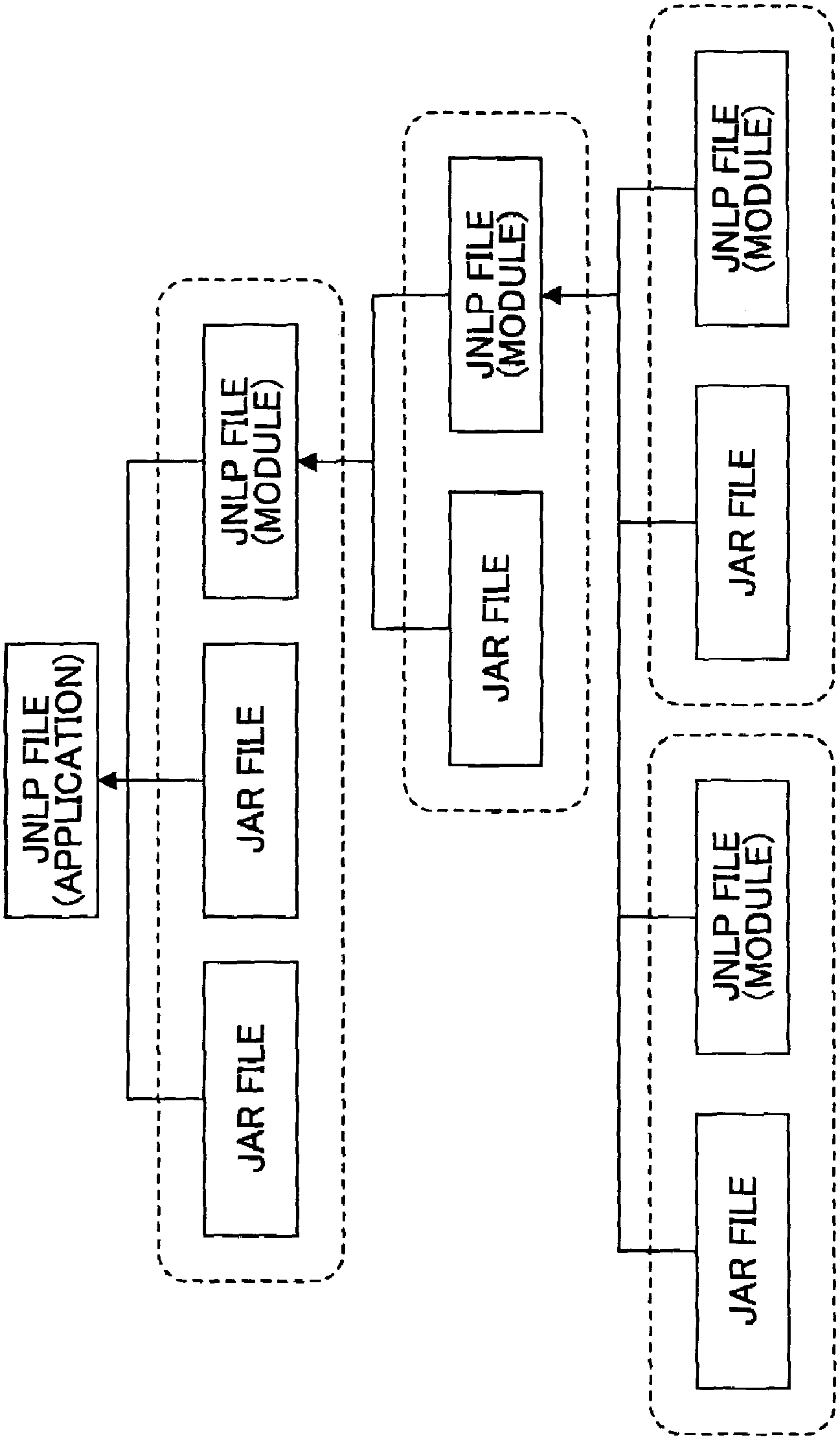
FIG. 11 shows a tree structure of the JNLP file.

Information of the JNLP file corresponding to the JAVA application generally has a tree structure as shown in FIG. 11. A JNLP file referred to from an upper JNLP file corresponds to a module that is used in execution of a JAVA program corresponding to the upper JNLP file.

As described in the update element of FIG. 10, an installed JAVA application is a target of update. In the following, automatic update for automatically updating the installed JAVA application is described.

Figure 12:
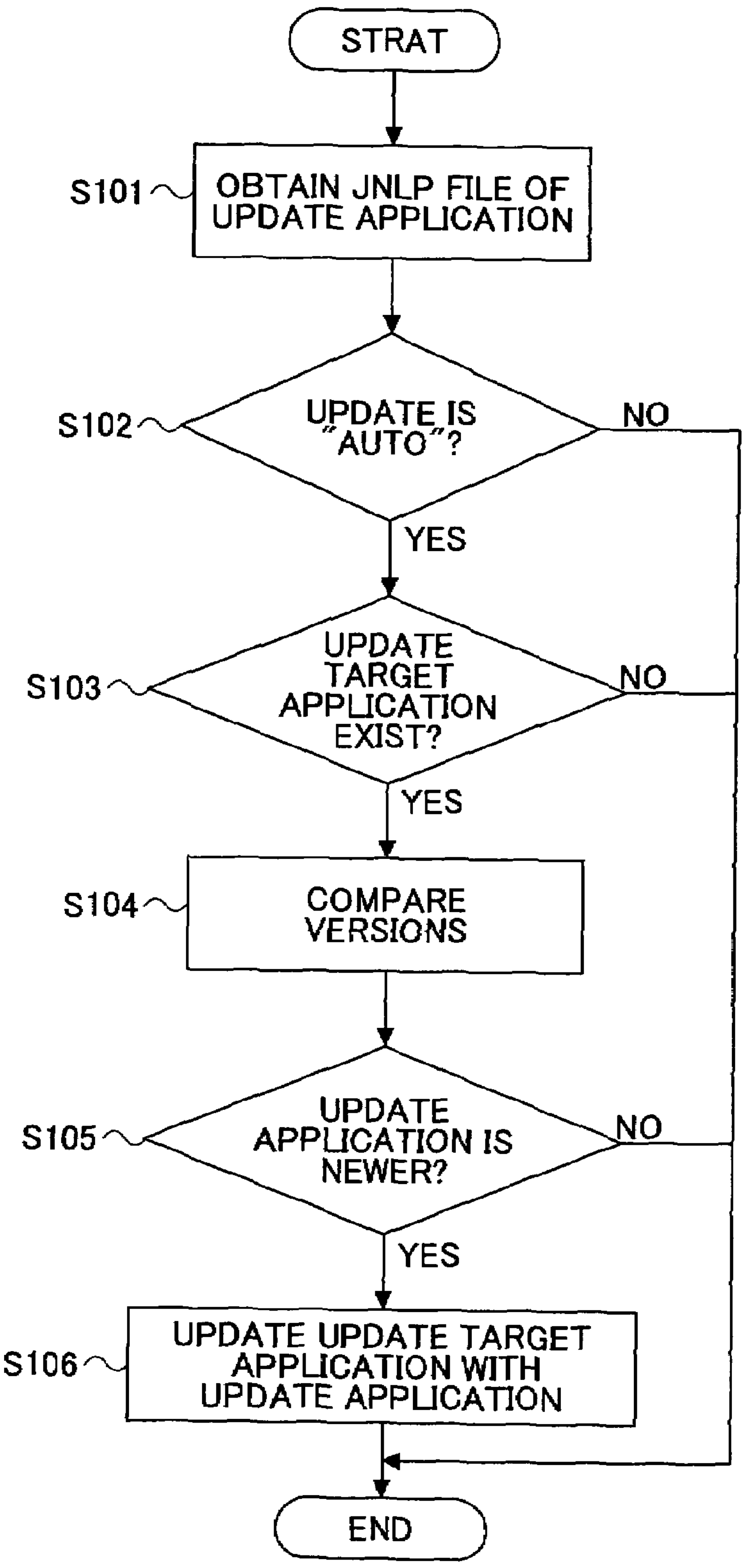
FIG. 12 is a flowchart for automatically updating a JAVA application (update target application) in an SD card (which is an example of a memory card) or in a HDD with a JAVA application (update application) from a SD card.

FIG. 12 is a flowchart for automatically updating a JAVA application (update target application) in an SD card (which is an example of a memory card) or in a HDD to a JAVA application (update application) from a SD card.

When a SD card including the update application is set in a SD card slot, the application management part 204 obtains a JNLP file of the update application in the SD card in step S101. When the update element of the JNLP file is "auto" and when the compound machine 100 includes an update target application same as the update application corresponding to the JNLP file (steps S102, S103), the application management part 204 compares versions of the update application and the update target application in step S104. When the version of the update application is newer than the version of the update target application (step S105), the application management part 204 updates the update target application to the update application in step S106 (replaces the update target application with the update application). That is, the application management part 204 updates the Jar file and the JNLP file.

Figure 13:
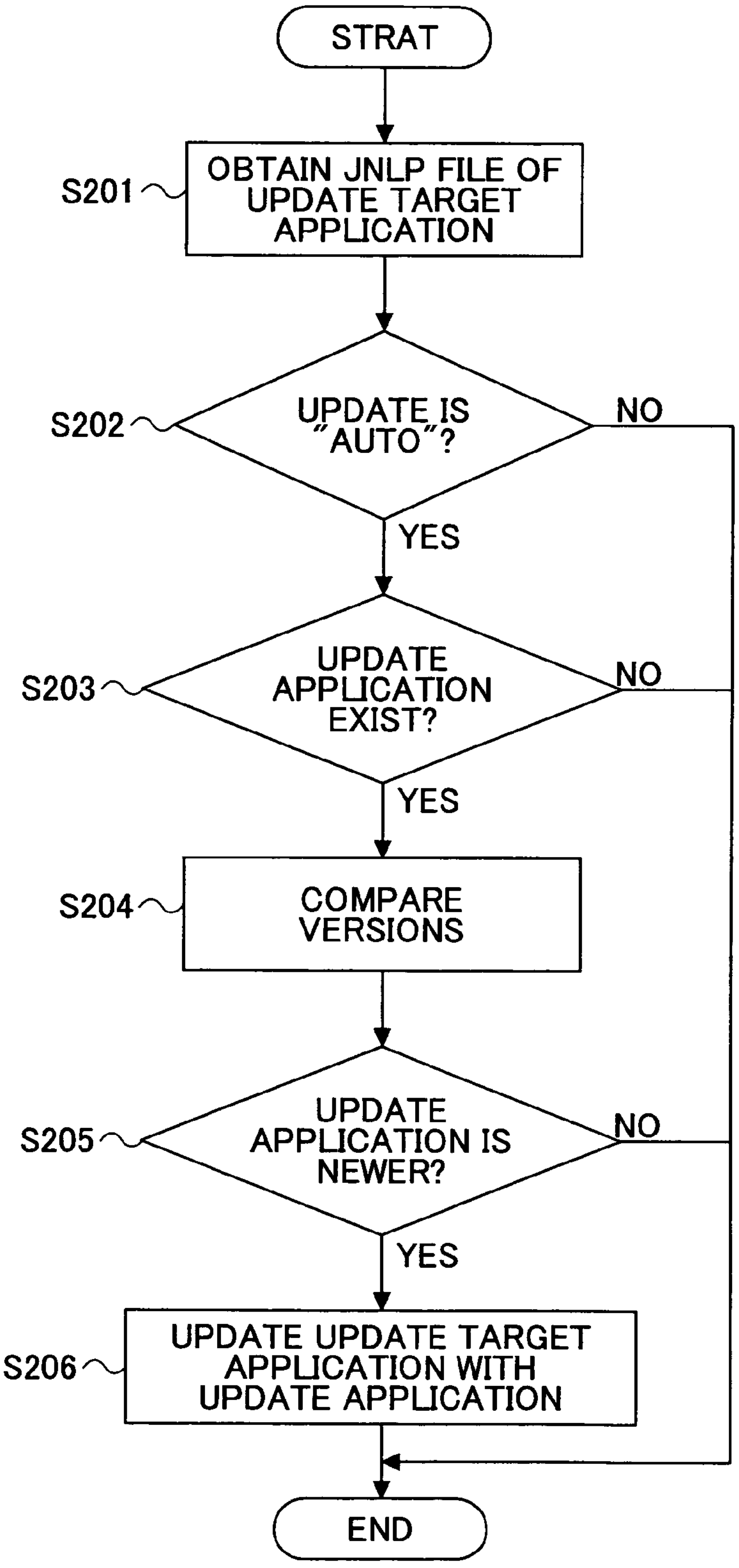
FIG. 13 is a flowchart for automatically updating a JAVA application (update target application) in the SD card or in the HDD with a JAVA application (update application) from a Web server.

FIG. 13 is a flowchart for automatically updating a JAVA application (update target application) in the SD card or in the HDD with a JAVA application (update application) from a Web server.

The application management part 204 obtains a JNLP file of the update target application in step S201. When the update element of the JNLP file is "auto" and when the Web server that is connected to the compound machine 100 includes an update application same as the update target application (step S202, S203), the application management part 204 compares versions of the update target application and the update application in step S204. When the version of the update application is newer than the version of the update target application, the application management part 204 updates the update target application with the update application in step S206.

The destination that the compound machine 100 accesses for accessing the update application can be obtained by referring to the JNLP file. When the JNLP file is the tree structure, the above-mentioned process is performed for JNLP files of each layer.

The trigger for starting the update may be an elapsed time from power on of the compound machine 100, a predetermined time, power ON/OFF of the compound machine 100, before running/while running/after running application, an elapsed time while idling, and the like.

Also in the first embodiment, the JNLP file can be used. In such a case, before downloading the JAVA application, the compound machine 100 can check if the JAVA application is executable according to information in the JNLP file. In this case, the JNLP file includes information used for determining whether the JAVA application is executable in the compound machine 100. For example, the JNLP file includes information for authentication, device configurations (color supported, for example) necessary for executing the JAVA application, use resource information and the like in addition to the program size and the like described in the first embodiment. The information in the JNLP file are compared with resource information and the like in the compound machine 100. As a result, if the compound machine 100 determines that the JAVA application is not executable, a warning is output, for example. In addition, the Jar file may include a digital signature for authentication, so that the application management part 204 may verify the signature.

Third Embodiment

Next, a method is described in which the compound machine 100 is operated remotely by executing a JAVA application in a PC which may be used for developing the JAVA application.

Figure 14:
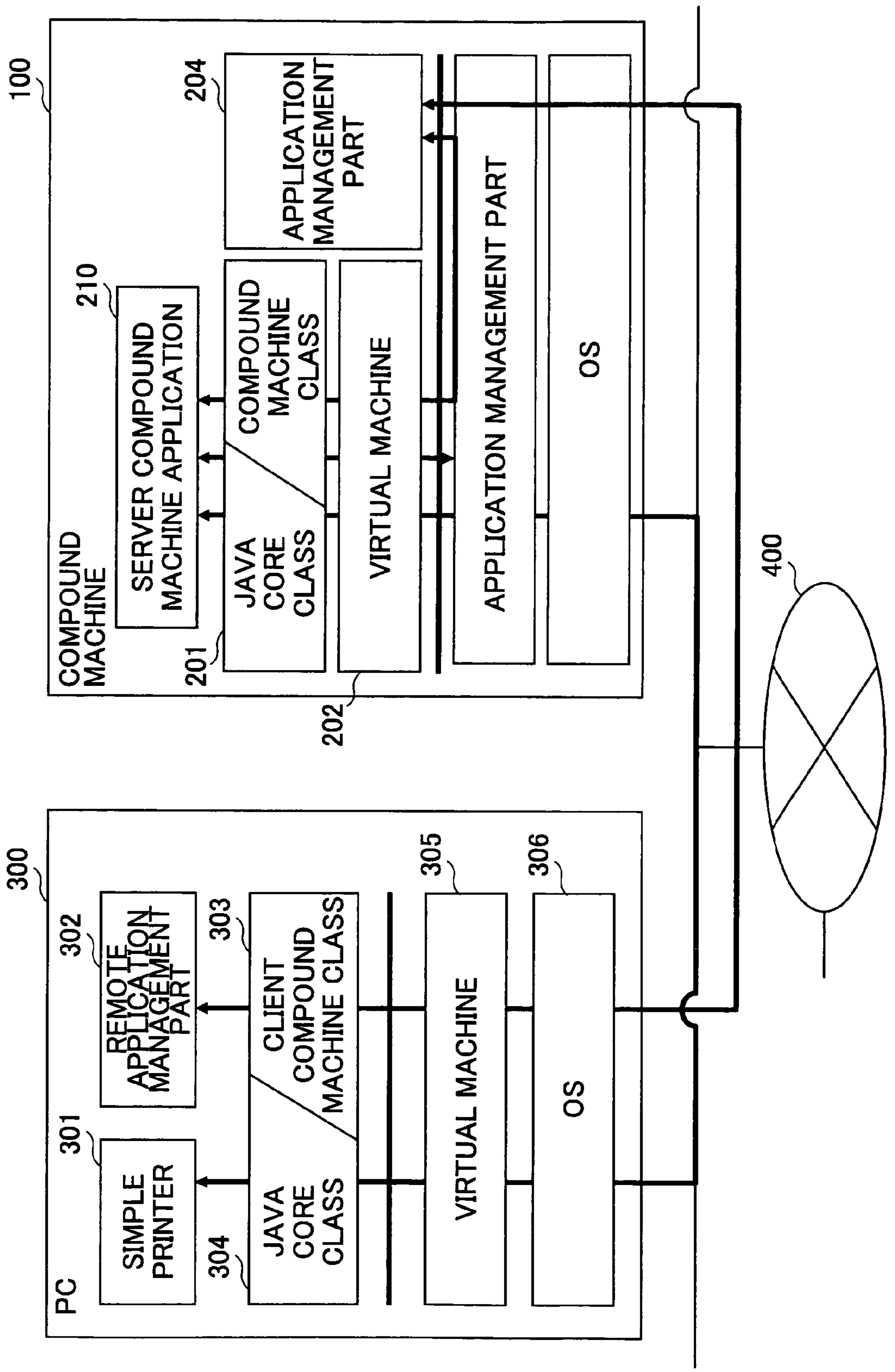
FIG. 14 shows a system configuration according to a third embodiment of the present invention.

FIG. 14 shows a system configuration for executing the JAVA application according to this embodiment. As shown in the figure, the system includes a PC 300 and a compound machine 100 that are connected via a network 400. The PC 300 is a PC used for developing a JAVA application for the compound machine 100, for example.

The PC 300 includes a simple printer 301 that is a JAVA application, a JAVA core class 304, a client compound machine class 303 for operating the compound machine class in the compound machine 100, a remote application management part 302 for managing applications by communicating with the application management part 204 of the compound machine 100, a virtual machine 305 and a OS 306.

The compound machine 100 includes a server compound machine application 210 in addition to the JAVA execution environment 116. The server compound machine application 210 is an application executed in the compound machine 100 for providing remote operation service from the PC 300. The native program interface is not shown in FIG. 14.

The client compound machine class 303 in the PC 300 communicates with the server compound machine application 210, so that the client compound machine class 303 operates objects in the compound machine 100. Accordingly, the compound machine 100 can be operated remotely from the PC 300, and distributed processing of applications can be realized. The technique for operating objects in the compound machine 100 from the remote PC 300 can be realized by using JAVA based distributed object processing technology, for example.

The remote application management part 302 communicates with the application management part 204 of the compound machine 100 so that the JAVA application management function for the compound machine 100 can be extended to the PC 300. The remote application management part 302 includes functions same as those of the application management part 204 of the compound machine 100. That is, the remote application management part 302 includes functions for the JAVA application execution management (launch/forced termination/suspend/resume and the like), install and update of the JAVA application, delete of installed JAVA application, password setting for application registration, storing JAVA application, display list of installed JAVA applications and the like. The above-mentioned processes are performed by communicating with the application management part 204 of the compound machine 100 as necessary.

The client compound machine class 303 in the PC 300 also includes a function for emulating a part of functions of the compound machine 100. For example, the client compound machine class 303 can emulate operations of the operation panel of the compound machine 100.

For operating the compound machine 100 by using an application executed in the PC 300, it can be selected whether to use the operation panel of the compound machine 100 or to use the emulation function in the PC 300. In the case where the operation of the operation panel is emulated, the screen to be displayed on the operation panel of the compound machine 100 is displayed on the PC 300. The keyboard and the mouse of the PC 300 are used for operating the operation buttons displayed on the PC 300. The selection between using the operation panel of the compound machine 100 and using the keyboard and the mouse of the PC 300 is performed by sending a request from the remote application management part 302 to the application management part 204 of the compound machine 100. For example, when the remote application management part 302 notifies the application management part 204 in the compound machine 100 that the PC 300 emulates the operation panel, the application management part 204 controls the compound machine 100 such that screen display information generated by operating the compound machine 100 is sent to the PC 300 instead of displaying on the compound machine 100.

When executing the JAVA application from the PC 300, as to same kind of resources in the remote PC 300 and the compound machine 100, the user can select one between the remote PC 300 and the compound machine 100. For example, as to "hard disk" that is included in both of the PC 300 and the compound machine 100, the user can select whether using a hard disk of the PC 300 or a hard disk of the compound machine 100 from the PC 300. Other such resources are resources for networking, I/O(USB, ilink, RS 232C) and the like.

Figure 15:
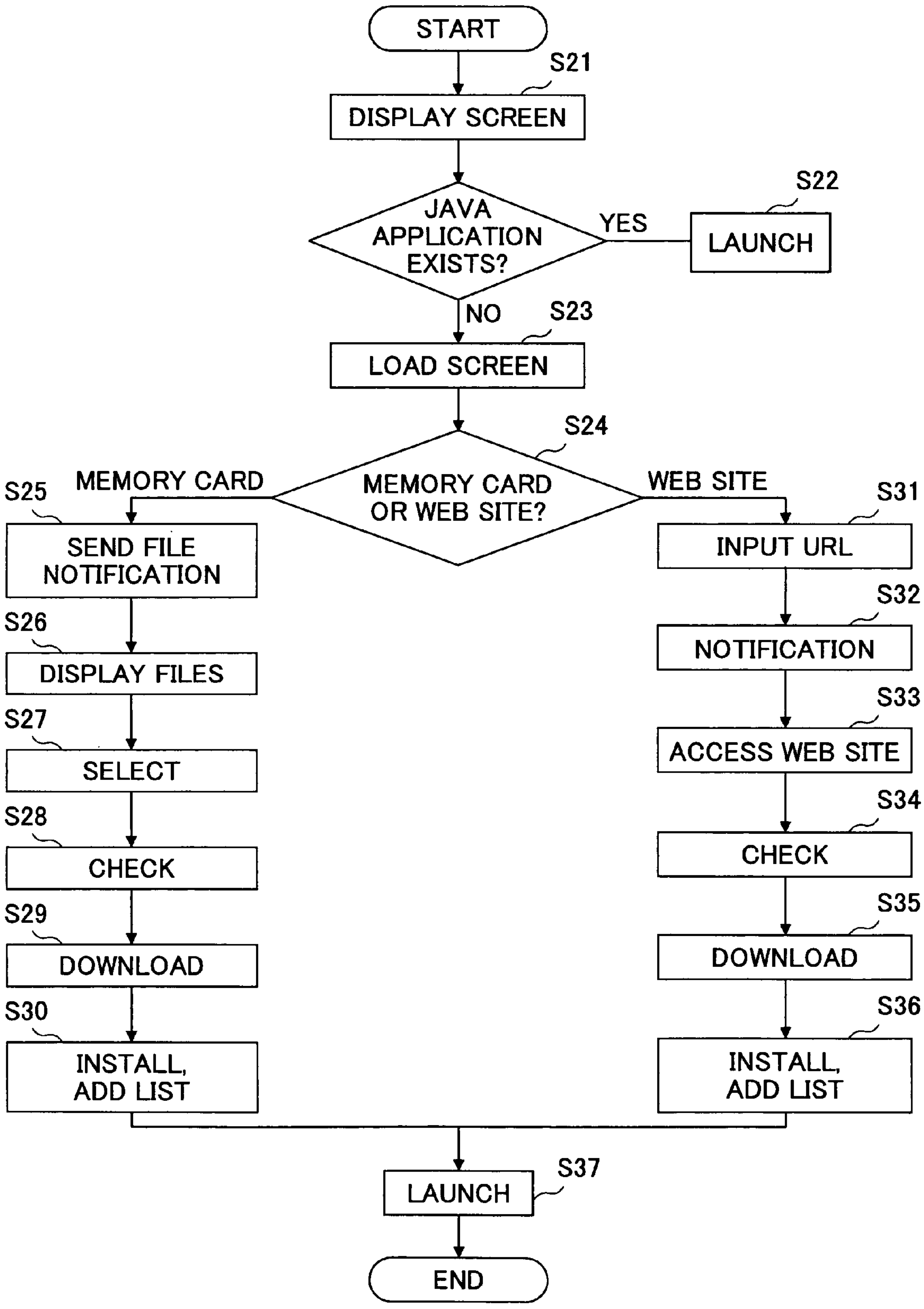
FIG. 15 is a flowchart showing a procedure for launching the simple printer according to the third embodiment.

Next, in the environment indicating FIG. 14, a procedure for operating the compound machine 100 by executing a JAVA application in the PC 300 is described with reference to a flowchart of FIG. 15. In the following example, the simple printer is used as an example.

First, the remote application management part 302 is launched in the PC 300. In the compound machine 100, the JAVA execution environment 116 including the application management part 204, and the server compound machine application 210 are already executed.

The remote application management part 302 displays a screen for selecting an application on the PC 300 in step S21. At this time, it is checked whether the JAVA application is installed in the hard disk in the compound machine 100 or in the hard disk in the PC 300. In the check of the JAVA application, for example, the remote application management part 302 checks the JAVA application in the PC 300, and the application management part 204 in the compound machine 100 checks the JAVA application in the compound machine 100 and the application management part 204 notifies the remote application management part 302 of the check result. When the JAVA application exists, the JAVA application name is displayed on the screen. When the user selects the simple printer, the simple printer is launched in step S22.

As a result of the check whether the JAVA application is installed, if the JAVA application is not installed in either of the hard disks, an application load screen is displayed by specifying application load from the screen in step S23.

The user selects, from the application load screen, whether to download the simple printer from a Web site or from a memory card inserted in the compound machine 100 in step S24.

When the user select to install the JAVA application from the memory card, the application management part 204 recognizes the memory card when the memory card is inserted into the compound machine 100, and the application management part 204 checks file information in the memory card, and notifies the remote application management part 302 of the file information in step S25.

The remote application management part 302 displays the notified file information on the screen of the PC 300 in step S26, so that the user selects the simple printer in step S27. Then, the remote application management part 302 notifies the application management pat 204 that the simple printer is a target for downloading. The application management part 204 sends information on the application (simple printer) to the remote application management part 302. The remote application management part 302 checks whether the simple printer is executable in the environment of the system in step S28. If the remote application management part 302 determines that the simple printer is executable, the remote application management part 302 instructs the application management part 204 to download the simple printer, so that the simple printer is downloaded in step S29 and installed into an install destination (hard disk of the PC 300 or the hard disk of the compound machine 100) that is already specified in step S30. In addition, the simple printer is added to the application list.

The check items in the step S28 are, for example, program size, version, program latest update information, use memory work size, use storage size, use network address, the term of validity (usable number), application program name and the like.

In the case when the simple printer is installed from a Web sit, the remote application management part 302 displays a screen for allowing the user to specify a URL of the Web server, so that the user inputs the URL from the screen in step S31. Then, the remote application management part 302 notifies the application management part 204 in the compound machine 100 of the URL in step S32. Then, the application management part 204 accesses the Web site of the URL in step S33, and checks whether the application (simple printer) in the Web site can operate the compound machine 100 from the PC 300 in step S34. This check can be also performed by the remote application management part 302. In this case, the application management part 204 obtains predetermined information (JNLP file for example) and send the information to the remote application management part 302.

When it is determined that the application can operate the compound machine 100, the simple printer is downloaded in step S35, and installed in a specified hard disk. Then, the simple printer is added to the application list in step S36.

When the simple printer is installed, the simple printer can be selected from a screen of step S21. When the simple printer is selected, the remote application management part 302 loads the simple printer in the virtual machine 305 in the PC 300, so that the simple printer is executed in step S37.

The simple printer operates the compound machine 100 by using the JAVA core class 304 and the client compound machine class 303. In the operation of the compound machine 100, for example, the simple printer 301 sends a message to the server compound machine application 210 in the compound machine 100, so that the server compound machine application 210 operates objects in the JAVA execution environment in the compound machine 100 so as to operate the compound machine 100.

As mentioned before, the simple printer 301 initially displays the graphical interface screen. Whether displaying the screen on the PC 300 or on the operation panel of the compound machine 100 can be selected. For example, after the user selects the simple printer, the remote application management part 302 displays a screen for selecting whether displaying the screen on the PC 300 or on the operation panel of the compound machine 100, so that the selection is realized. In this embodiment, the PC 300 is selected and a screen that is an emulation screen of the operation panel is displayed on the PC 300.

Next, the user selects, from the screen of the PC 300, a name of a file to be printed. The user can selects one among the hard disk of the PC 300 and the hard disk of the compound machine 100 as a storage of the file that the user wants to print. Since the user can selects the hard disk of the compound machine 100, the user can perform operations on the PC 300 as if to operate the compound machine 100 on the operation panel. The selection can be performed by displaying a screen for selecting between the hard disks when the simple printer is selected by the remote application management part 302.

When the hard disk of the compound machine 100 is selected, the user specifies a file to print as "/hdd/ts/photo.tiff" for example from the screen of the PC 300. As a result, the file in the hard disk of the compound machine 100 is selected so that the file is printed.

For ending the operation of the compound machine 100, the remote application management part 302 requests the application management part 204 of the compound machine 100 to end or pause the application, and ends communications with the compound machine 100.

Like the second embodiment, also in the third embodiment, the JAVA application can be automatically updated by using the JNLP file.

Fourth Embodiment

Figure 16:
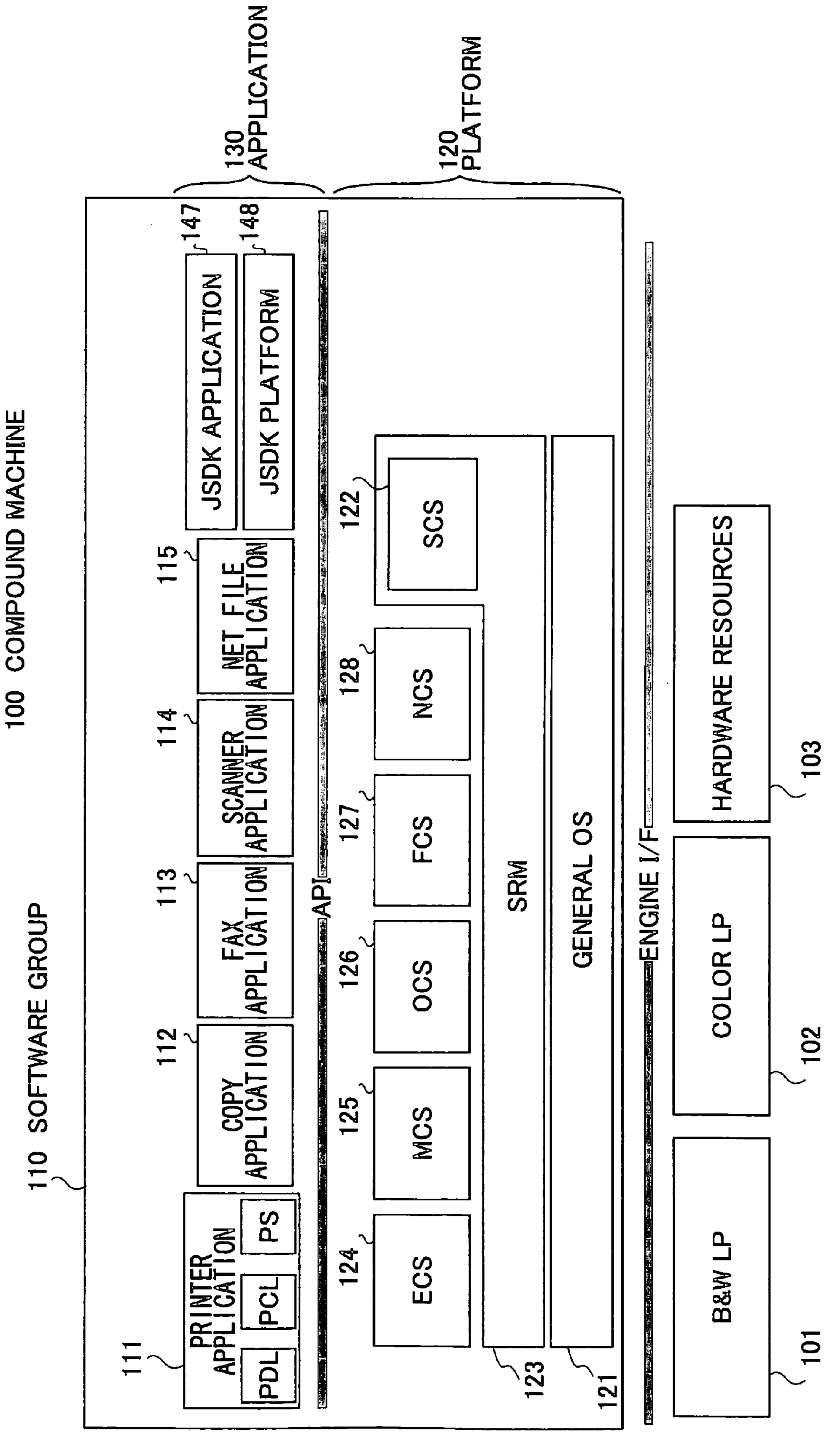
FIG. 16 is a block diagram of the compound machine according to a fourth embodiment of the present invention.

In the following, another example regarding the remote operation of the third embodiment is described as the fourth embodiment. In the fourth embodiment, the compound machine 100 is configured as shown in FIG. 16. In the compound machine 100 in FIG. 16, the JAVA execution environment 116 and the JAVA application 117 are changed to a JSDK application 147 and a JSDK platform 148. The JSDK platform 148 is for performing mediation with other software and application management and the like.

"SDK" means a specific software development kit, and an application developed by using the SDK is called "SDK application". As a specific SDK, for example, "JSDK" is provided for developing an application by using JAVA language. An application developed by using the JSDK is called "JSDK application".

Figure 17:
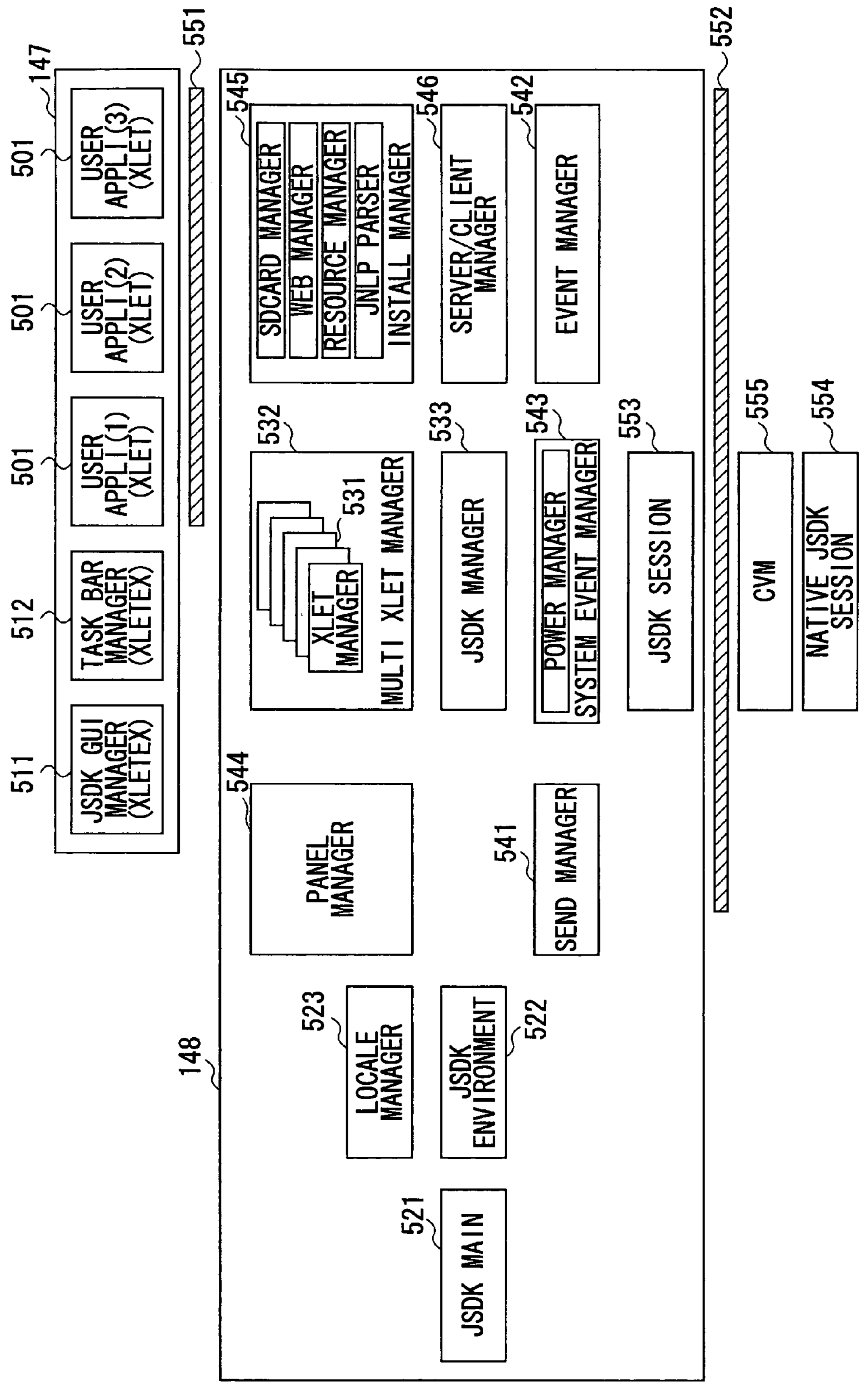
FIG. 17 shows classes of the JSDK application 147 and the JSDK platform 148 in FIG. 16.

FIG. 17 shows classes of the JSDK application 147 and the JSDK platform 148 in FIG. 16. The JSDK application 147 and the JSDK platform 148 are compiled from source code to byte code by a JAVA compiler, and are executed by a JAVA virtual machine step by step. The JSDK application 147 and the JSDK platform 148 are based on Personal Basis Profile of JAVA 2 Micro Edition.

The JSDK application 147 includes a user application 501, a JSDK GUI Manager 511, and a Task Bar Manager 512.

The user application 501 is a JSDK application developed by using the JSDK by a user (a software vender, for example) of the compound machine 100. The JSDK GUI Manager 511 is a JSDK application for displaying operation screens for operating JSDK applications. The Task Bar Manager 512 is a JSDK application for displaying task bars for operating JSDK applications.

The user application 501 is "Xlet" that is a JAVA application. Each of the JSDK GUI Manager 511 and the Task Bar Manager 512 is "Xlet (XletEx)" that is extended from the Xlet.

The JSDK platform 148 includes classes such as a JSDK Main 521, a JSDK Environment 522, a Locale Manager 523, a Xlet Manager 531, a Multi Xlet Manager 532, a JSDK Manager 533, a Send Manager 541, an Event Manager 542, a System Event Manager 543, a Panel Manager 544, an Install Manager 545, a Server/Client Manager 546 and the like.

The JSDK Main 521 is a class for launching the JSDK Environment 522. The JSDK Environment 522 is a class for performing launch environment setting for the JSDK system. The Locale Manager 523 is a class for performing foreign language supporting and the like.

The Xlet Manager 531 is a class for managing life cycle of the Xlet. The life cycle of the five Xlets are managed by five Xlet Managers. The five Xlets are in a one-to-one correspondence with the five Xlet Managers. All of the life cycle of the all Xlet managers are managed by the Multi Xlet Manager 532. The JSDK Manager 533 is a class for managing the life cycle of the whole of the JSDK system. For example, the life cycles of the Multi Xlet Manager 532, the Send Manager 541, the Event Manager 542, the System Event Manager 543, the Panel Manager 544, the Install Manager 545 and the Server/Client Manager 546 are managed by the JSDK Manager 533. The life cycle of the Xlet is state transitions, for example, initialization state (Loaded), paused state (Paused), active state (Active), end state (Destroyed) and the like.

The System Event Manager 543 is a class for managing system events (such as power mode) from the platform 120. The Panel Manager 544 is a class for performing mediation and the like when one Xlet occupies the screen of the operation panel. The Install Manager 545 is a class for managing install or uninstall of applications from the SD card and the Web server.

The JSDK system of FIG. 17 includes JSDK API 551 and JSDK API 552. The difference between the Xlet and the XletEx is that the XletEx can use the JSDK API 551 for accessing objects and can access the JSDK platform. The compound machine 100 of FIG. 16 further includes a JSDK Session 553 and a Native JSDK Session 554 that are interfaces between C language and JAVA language. The compound machine 100 of FIG. 16 further includes a CVM 555 that is a JAVA virtual machine.

Figure 18:
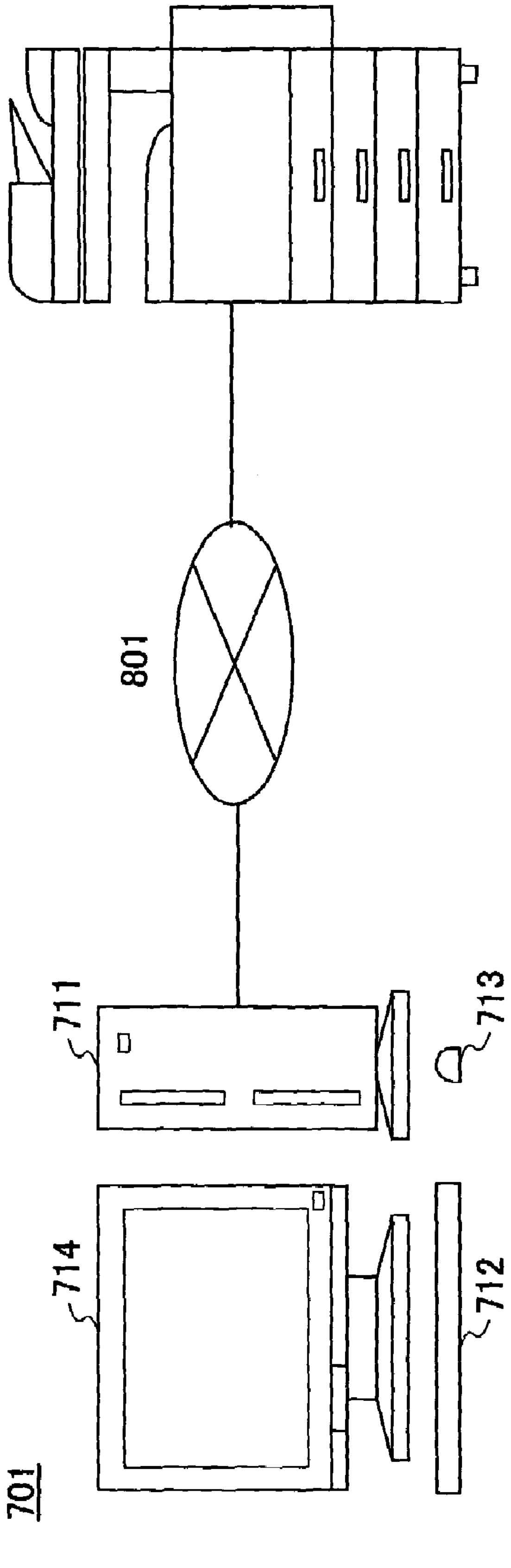
FIG. 18 shows a system configuration according to the fourth embodiment.

As shown in FIG. 18, the compound machine 100 is connected to a PC 701. The PC 701 functions as an emulator of the compound machine 100.

The PC 701 in FIG. 18 includes, for example, a keyboard 712, a mouse 713, a display 714 and the like. The body 711 includes a CPU, a ROM, a RAM, a NVRAM, a HDD, a MODEM, and a NIC and the like.

The keyboard 712 and the mouse 713 are hardware (operation part) used by an operator for inputting data. The display 714 is hardware (display part) for outputting data.

Figure 19:
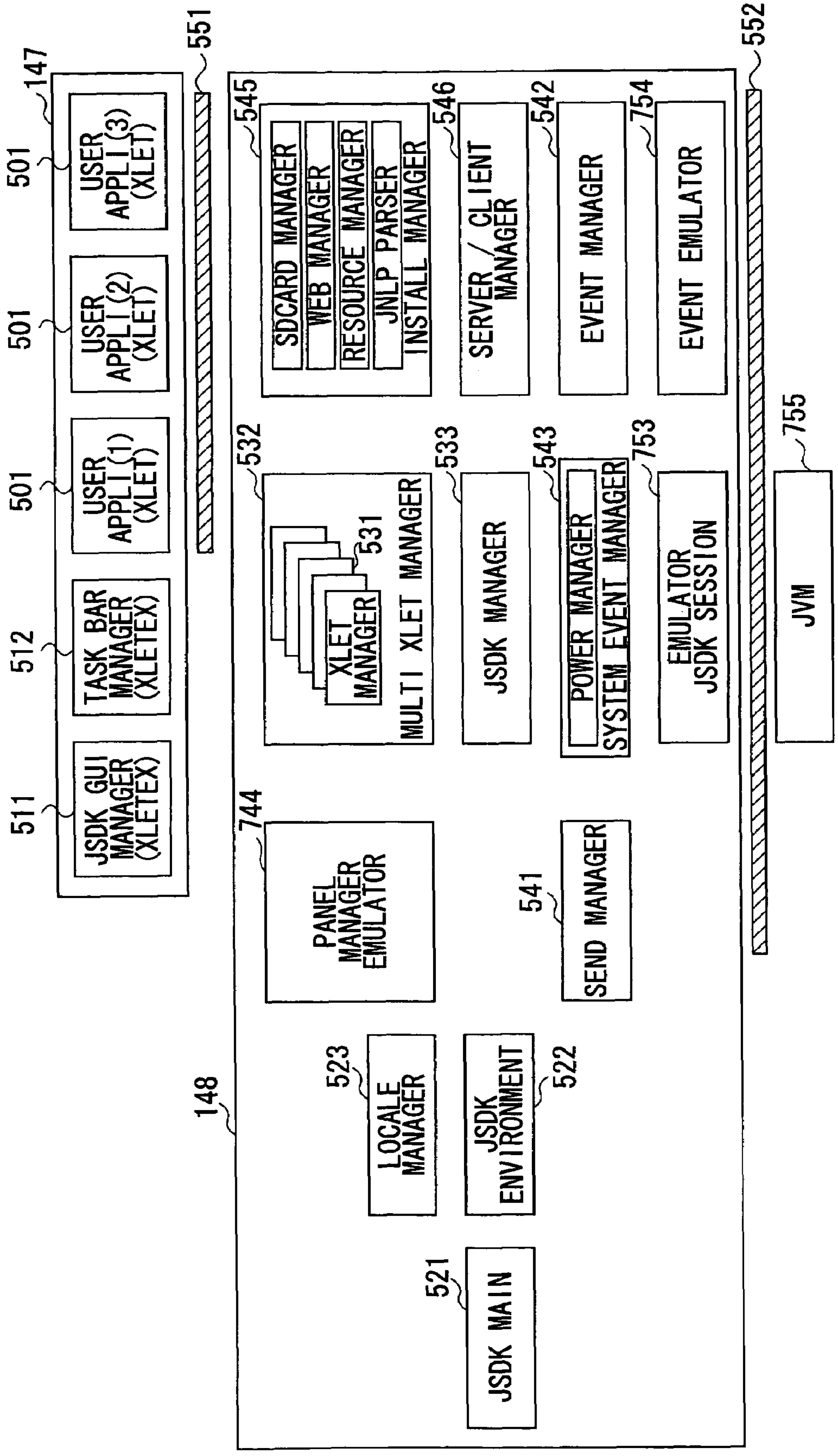
FIG. 19 shows classes of the JSDK application 147 and the JSDK platform 148 in the PC 701 in FIG. 18.

FIG. 19 shows classes of the JSDK application 147 and the JSDK platform 148 in the PC 701 in FIG. 18. The PC 701 of FIG. 19 includes the JSDK application 147 and the JSDK platform 148 same as those shown in FIG. 16.

The differences between FIG. 17 and FIG. 19 are as follows.

First, the Panel Manager 544 in FIG. 17 is replaced by a Panel Manager Emulator 744 in FIG. 19. Second, the JSDK Session 553 in FIG. 17 is replaced by the Emulator JSDK Session 753 in FIG. 19. Third, the Native JSDK Session 554 of FIG. 17 is replaced by an Event Emulator 754 in FIG. 19. Fourth, the CVM 555 of FIG. 17 is replaced by the JVM 755 of FIG. 19.

The Panel Manager Emulator 744 is a class for emulating the Panel Manager 544 to change operations of the operation panel to operations of the keyboard 712 and the mouse 713. The Emulator JSDK Session 753 is a class for establishing communication routes. The Event Emulator 754 is a class for emulating operations of the compound machine 100. The JVM 755 is a JAVA virtual machine for executing the JSDK application 147 and the JSDK platform 148.

Figure 20:
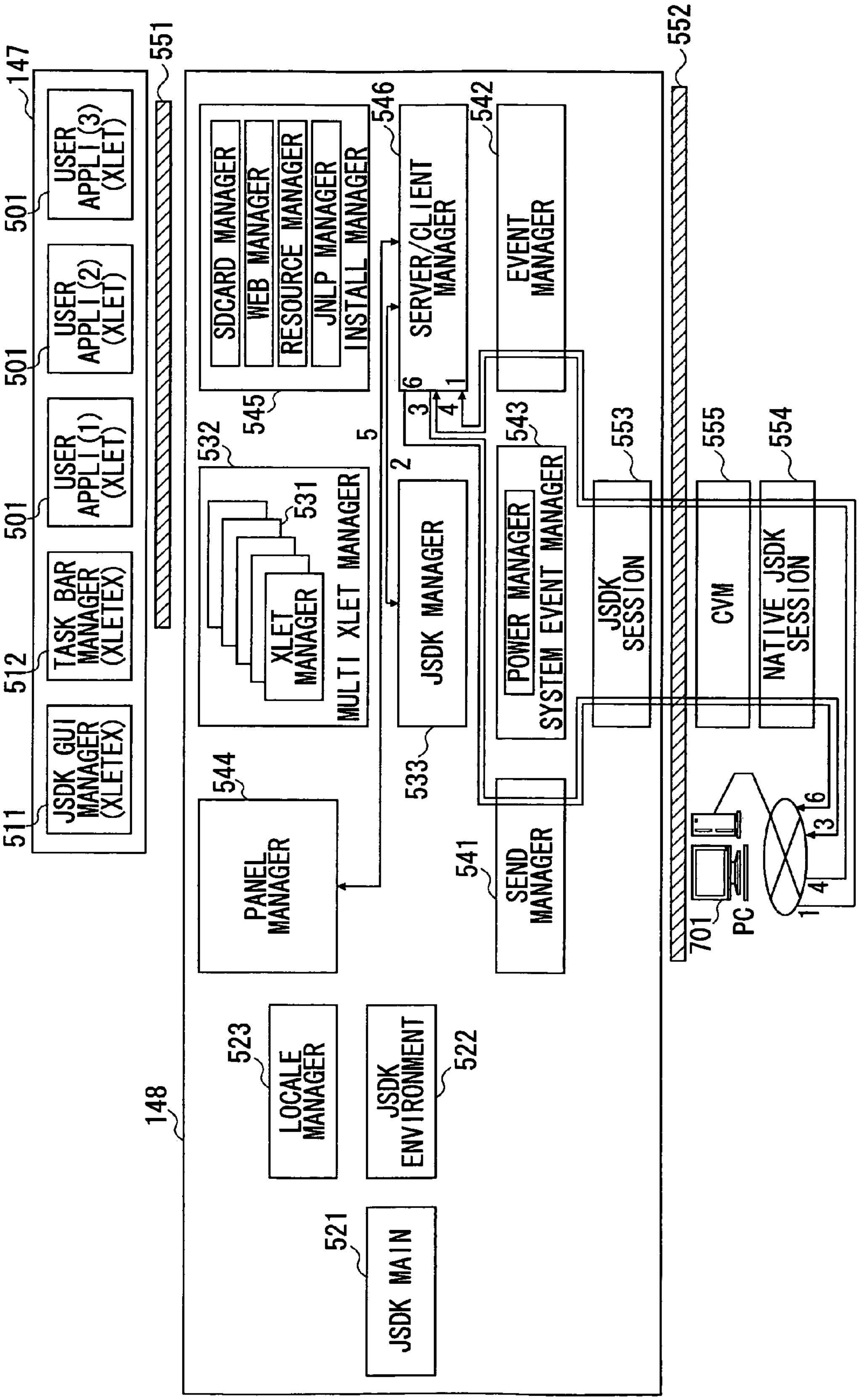
FIG. 20 is a figure for explaining execution procedure of preparation processes for remote operation in the compound machine 100.

FIG. 20 is a figure for explaining execution procedure of preparation processes for remote operation in the compound machine 100.

First, a communication session is established between the Server/Client Manager 546 in the compound machine 100 and the Server/Client Manager 546 in the PC 701 (1). The establishment of the session is performed by a protocol similar to SIP (Session Initiation Protocol).

Next, the Server/Client Manager 546 in the compound machine 100 asks the JSDK Manager 533 in the compound machine 100 whether the compound machine 100 can change to the remote operation mode, so as to determine whether the remote operation can be performed (2).

When the remote operation can be performed, the Server/Client Manager 546 in the compound machine 100 sends a request message necessary for remote operation to the PC 701 via the Send Manager 541 (3), and receives a response message necessary for remote operation from the PC 701 via the Event Manager 542 in the compound machine 100 (4).

Next, the Server/Client Manager 546 in the compound machine 100 requests the Panel Manager 544 to send information for remote operation to the PC 701 (5).

Finally, between the Server/Client Manager 546 in the compound machine 100 and the Server/Client Manager 546 in the PC 701, notifications are exchanged for notifying each other of completion of preparation of remote operation (6). Accordingly, the remote operation from the PC 701 to the compound machine 100 can be performed. Functions for realizing distribution processes of applications described in the third embodiment can be included, for example, in the Server/Client Manager 546 in the compound machine 100 and the Server/Client Manager 546 in the PC 701.

Each program described in the first to fourth embodiments can be stored in a recording medium such as a memory card. From the recording medium, the program can be installed in the compound machine 100. In addition, a program for constituting the JAVA execution environment such as the virtual machine can be also stored in a recording medium such as a CD-ROM, and can be installed in the PC 300 from the CD-ROM.

As mentioned above, according to the present invention, by providing a JAVA execution environment in the compound machine 100, the JAVA application can be easily installed and launched on the compound machine 100. Therefore, the JAVA application can be easily executed. In addition, the compound machine 100 can be operated by executing a JAVA application in a terminal apparatus connected to the compound machine 100 via a network.

The present invention is not limited to the specifically disclosed embodiments, and variations and modifications may be made without departing from the scope of the present invention.

The present application contains subject matter related to Japanese patent application No. 2003-082908, filed in the JPO on Mar. 25, 2003, and Japanese patent application No. 2004-078979, filed in the JPO on Mar. 18, 2004, the entire contents of which being incorporated herein by reference.

What is claimed is:

1. An image forming apparatus comprising:

hardware resources used for image formation;

a plurality of first application executed by a processor to perform image formation processing;

a platform that exists between the first applications and the hardware resources, the platform including an OS and at least one control service to control an execution of requested processing of the hardware resources according to a function call from the first applications, wherein interprocess communication is performed between the at least one control service and the first applications;

a virtual machine that is executed as one of the first applications;

a second application that is executed by the virtual machine; and an application management part managing the second application that is executed by the virtual machine.

2. The image forming apparatus as claimed in claim 1, wherein the second application that is executed by the virtual machine operates the image forming apparatus by using classes for controlling the image forming apparatus.

3. The image forming apparatus as claimed in claim 2, wherein the classes include an operation panel class for outputting information to an operation panel of the image forming apparatus and for inputting information from the operation panel.

4. The image forming apparatus as claimed in claim 1, wherein the application management part includes execution management functions that include a function for launching the second application executed by the virtual machine.

5. The image forming apparatus as claimed in claim 1, wherein the second application management part downloads the application when the application is not installed in the image forming apparatus.

6. The image forming apparatus as claimed in claim 1, wherein the application management part refers to an application information file associated with the second application, and updates the second application on the basis of information in the application information file.

7. The image forming apparatus as claimed in claim 6, wherein the application management part compares a first version described in the application information file associated with the second application with a second version described in another application information file associated with an update application, and the application management part replaces the second application with the update application if the second version is newer than the first version.

8. The image forming apparatus as claimed in claim 5, wherein the application management part downloads the second application from a memory card or from a Web site.

9. The image forming apparatus as claimed in claim 6, wherein the application management part downloads the second application from a location described in the application information file associated with the second application.

10. The image forming apparatus as claimed in claim 6, wherein the application management part checks whether the second application is executable in the image forming apparatus before downloading the second application.

11. The image forming apparatus as claimed in claim 10, wherein the application management part checks whether the second application is executable on the basis of information described in the application information file associated with the second application.

12. The image forming apparatus as claimed in claim 10, wherein the application management part checks items including a resource item in the image forming apparatus necessary for executing the second application.

13. The image forming apparatus as claimed in claim 1, wherein the image forming apparatus includes a server application that receives an operation request from a terminal apparatus connected to the image forming apparatus and that operates the image forming apparatus according to the operation request.

14. The image forming apparatus as claimed in claim 13, wherein the application management part communicates with the terminal apparatus.

15. A method for operating an image forming apparatus configured to include a plurality of applications by using an application that is executed on a terminal apparatus connected to the image forming apparatus via a network, the method comprising:

performing image formation using hardware resources of the image forming apparatus;

performing image formation processing at the plurality of applications of the image forming apparatus;

controlling an execution of requested processing of the hardware resources according to a function call from the applications at least one control service located in a platform that includes an OS and exists between the applications and the hardware resources, wherein interprocess communication is performed between the at least one control service and the applications, and the image forming apparatus includes a virtual machine that is one of the plurality of applications and a server application executed by the virtual machine, and the terminal apparatus includes a virtual machine and the application; and receiving, at the server application, an operation request sent by the application in the terminal apparatus, so that the server application operates the image forming apparatus according to the operation request.

16. The method as claimed in claim 15, wherein the terminal apparatus operates the image forming apparatus by using a Java based distributed object processing technique.

17. The method as claimed in claim 15, wherein the image forming apparatus includes an application management part for managing the application, and the terminal apparatus includes a remote application management part for managing the application by communicating with the application management part.

18. A computer readable recording medium storing a computer program executed in an image forming apparatus that includes hardware resources used for image formation, a plurality of first applications configured to perform image formation processing, and a platform that exists between the first applications and the hardware resources, the platform including an OS and at least one control service to control an execution of requested processing of the hardware resources according to a function call from the first applications, wherein interprocess communication is performed between the at least one control service and the first applications, the computer program comprising:

virtual machine program code that is executed as one of the first applications; and application management program code managing a second application executed by the virtual machine program code.

19. The computer readable recording medium as claimed in claim 18, wherein the computer program includes classes that are used by the second application and that controls the image forming apparatus.

20. The computer readable recording medium as claimed in claim 19, wherein the classes includes an operation panel class for outputting information to an operation panel of the image forming machine and for inputting information from the operation panel.

21. The computer readable recording medium as claimed in claim 18, wherein the application management program code includes execution management functions that include a function for launching the second application.

22. The computer readable recording medium as claimed in claim 21, wherein the application management program code downloads the second application when the second application is not installed in the image forming apparatus.

23. The computer readable recording medium as claimed in claim 18, wherein the application management program code refers to an application information file associated with the second application, and updates the second application on the basis of information in the application information file.

24. The computer readable recording medium as claimed in claim 23, wherein the application management program code compares a first version described in the application information file associated with the second application with a second version described in another application information file associated with an update application, and the application management program code replaces the second application with the update application if the second version is newer than the first version.

25. The computer readable recording medium as claimed in claim 23, wherein the application management program code downloads the second application from a location described in the application information file associated with the second application.

26. The computer readable recording medium as claimed in claim 23, wherein the application management program code checks whether the second application is executable in the image forming apparatus before downloading the second application.

27. The computer readable recording medium as claimed in claim 26, wherein the application management program code checks whether the second application is executable on the basis of information described in the application information file associated with the second application.

28. The computer readable recording medium as claimed in claim 26, wherein the application management program code checks items including a resource item in the image forming apparatus necessary for executing the second application.

29. The computer readable recording medium as claimed in claim 18, wherein the computer program further includes a server application program that receives an operation request from a terminal apparatus connected to the image forming apparatus and that operates the image forming apparatus according to the operation request.

* * * * *

UNITED STATES PATENT AND TRADEMARK OFFICE

CERTIFICATE OF CORRECTION

PATENT NO. : 7,533,381 B2
APPLICATION NO. : 10/807323
DATED : May 12, 2009
INVENTOR(S) : Ando It is certified that error appears in the above-identified patent and that said Letters Patent is hereby corrected as shown below:

On the title page, the Terminal Disclaimer information has been omitted. Item (45) and the Notice information should read as follows:

--(45) **Date of Patent: * May 12, 2009**

(*) Notice: Subject to any disclaimer, the term of this patent is extended or adjusted under 35 U.S.C. 154(b) by 934 days.

This patent is subject to a terminal disclaimer.--

Signed and Sealed this

Seventh Day of July, 2009

JOHN DOLL

*Acting Director of the United States Patent and Trademark Office*